US012425489B2

(12) United States Patent
Prasad et al.

(10) Patent No.: US 12,425,489 B2
(45) Date of Patent: *Sep. 23, 2025

(54) INSERTING AND REPLACING PLACEHOLDERS IN RESOURCE CODE

(71) Applicant: Microsoft Technology Licensing, LLC, Redmond, WA (US)

(72) Inventors: Lakshmi Prasad, Kozhikode (IN); Meir Baruch Blachman, Jerusalem (IL); Eitam Meisel, Ra'anana (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,746

(22) Filed: Jul. 1, 2024

(65) Prior Publication Data

US 2024/0406285 A1 Dec. 5, 2024

Related U.S. Application Data

(63) Continuation of application No. 18/336,554, filed on Jun. 16, 2023, now Pat. No. 12,047,469.

(30) Foreign Application Priority Data

May 31, 2023 (IN) .............................. 202311037669

(51) Int. Cl.
*H04L 12/70* (2013.01)
*H04L 9/40* (2022.01)
*H04L 67/565* (2022.01)

(52) U.S. Cl.
CPC ............ *H04L 67/565* (2022.05); *H04L 63/08* (2013.01)

(58) Field of Classification Search
CPC .... H04L 67/565; H04L 63/08; H04L 63/0281
(Continued)

(56) References Cited

U.S. PATENT DOCUMENTS 9,531,715 B1 * 12/2016 Rodgers ............. H04L 63/0823
9,578,123 B2 * 2/2017 Meyer .................. H04L 67/568
(Continued)

FOREIGN PATENT DOCUMENTS

WO 2021126321 A1 6/2021

OTHER PUBLICATIONS

International Search Report and Written Opinion received for PCT Application No. PCT/US2024/030192, Sep. 3, 2024, 13 pages.

*Primary Examiner* — Ario Etienne
*Assistant Examiner* — Elizabeth Kassa
(74) *Attorney, Agent, or Firm* — Weaver IP L.L.C.

(57) ABSTRACT

Placeholders are inserted and replaced in placeholders in code included in resources. A proxy receives a request for a resource from a client and verifies an authentication credential included therein. The proxy determines a placeholder value indicating the authentication credential is verified and determines the requested resource corresponds to a first modified version of the resource stored in memory accessible to the proxy, the first modified version comprising a code component including a placeholder inserted by the proxy. The proxy replaces the placeholder with a first placeholder value to generate a second modified version of the resource and transmits the second modified version of the resource to a client. In another aspect, a client-side proxy service detects events in a modified version of a web page, inserts a placeholder in code of the web page, replaces the placeholder with a placeholder value, and evaluates the modified code.

20 Claims, 9 Drawing Sheets

(58) Field of Classification Search
USPC .......................................................... 709/246
See application file for complete search history.

(56) References Cited

U.S. PATENT DOCUMENTS

| | | | |
|---|---|---|---|
| 10,425,464 B2* | 9/2019 | Kolam ................... | H04L 65/80 |
| 11,321,156 B1* | 5/2022 | Bernatik ............... | G06F 11/076 |
| 11,349,814 B2* | 5/2022 | Rene ...................... | G06F 21/41 |
| 2012/0137213 A1* | 5/2012 | Hayler .................. | H04L 63/083 |
| | | | 715/239 |
| 2013/0097129 A1* | 4/2013 | Shea ..................... | G06F 16/972 |
| | | | 707/693 |
| 2015/0134956 A1* | 5/2015 | Stachura ............. | H04L 63/0815 |
| | | | 713/168 |
| 2018/0159832 A1 | 6/2018 | Gluck | |
| 2023/0116631 A1* | 4/2023 | Le Bouthillier .... | G06F 21/6209 |
| | | | 726/26 |
| 2023/0137417 A1 | 5/2023 | Tiwari | |
| 2023/0205734 A1* | 6/2023 | Zhang ................... | G06F 16/93 |
| | | | 707/722 |

* cited by examiner

420

430

INSERTING AND REPLACING PLACEHOLDERS IN RESOURCE CODE

CROSS-REFERENCE TO RELATED APPLICATIONS

This application is a Continuation of, and claims priority to, U.S. patent application Ser. No. 18/336,554, filed on Jun. 16, 2023, entitled "INSERTING AND REPLACING PLACEHOLDERS IN RESOURCE CODE," which claims priority to India Provisional Application No. 202311037669, filed on May 31, 2023, entitled "INSERTING AND REPLACING PLACEHOLDERS IN RESOURCE CODE," the entireties of which are incorporated by reference herein in their respective entireties.

BACKGROUND

A web server is a service operating in a computing device that accepts requests (e.g., via HTTP (Hypertext Transfer Protocol) or its secure variant HTTPS (HTTP Secure)), and in response, returns web content (e.g., web pages). Web proxies that sit between a web server executing on a server and a web browser executing on a client device may monitor interactions between the two sides and enforce security policies for these interactions. For example, the web proxy may be able to intercept resource requests emanating from a web browser, and based on a series of access control protocols, manage what a user of the web browser can access and interact with regarding a particular set of resources. Some proxies may modify code included in web pages received from a web server before passing the web page to a web browser. Modifying code can be a resource-intensive and time consuming task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for inserting and replacing placeholders in code included in resources. In one aspect of the present disclosure, a proxy receives a first request for a resource from the client. The first request comprises an authentication credential. The proxy verifies the authentication credential and determines a first placeholder value indicating the authentication credential is verified. The proxy determines the requested resource corresponds to a first modified version of the resource stored in memory accessible to the proxy computing device. The first modified version comprises a code component that includes a first placeholder inserted by the proxy. The proxy retrieves the first modified version. A second modified version of the resource is generated by replacing the placeholder with the first placeholder value in the code component. The second modified version of the resource is transmitted to the first client.

In a further example aspect, the proxy receives a resource from a server. The code component included in the resource is identified. The first modified version of the resource is generated by inserting the first placeholder in the identified code component. The first modified version of the resource is stored in the memory.

In a further example aspect, the proxy receives a second request for the resource from a second client. A second placeholder value is determined based on the received second request. The first modified version of the resource is retrieved. A third modified version of the resource is generated by replacing the first placeholder with the second placeholder value in the code component.

In a further example aspect, the identified code component comprises a static import statement.

In another aspect of the present disclosure, a browser of a client includes a client-side proxy service. The browser receives a modified version of a web page. The modified version of the web page includes an embedding function and a code rewriting function not included in the (e.g., original version of the) web page. An event in the web page associated with the embedding function and a code component is detected. The embedding function generates a first modified version of the code component by inserting a placeholder in the code component. An authentication credential is verified and a placeholder value indicating the authentication credential is verified is determined. The code rewriting function generates a second modified version of the code component by replacing the placeholder in the first modified version of the code component with the placeholder value. The second modified version of the code component is evaluated.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 7:
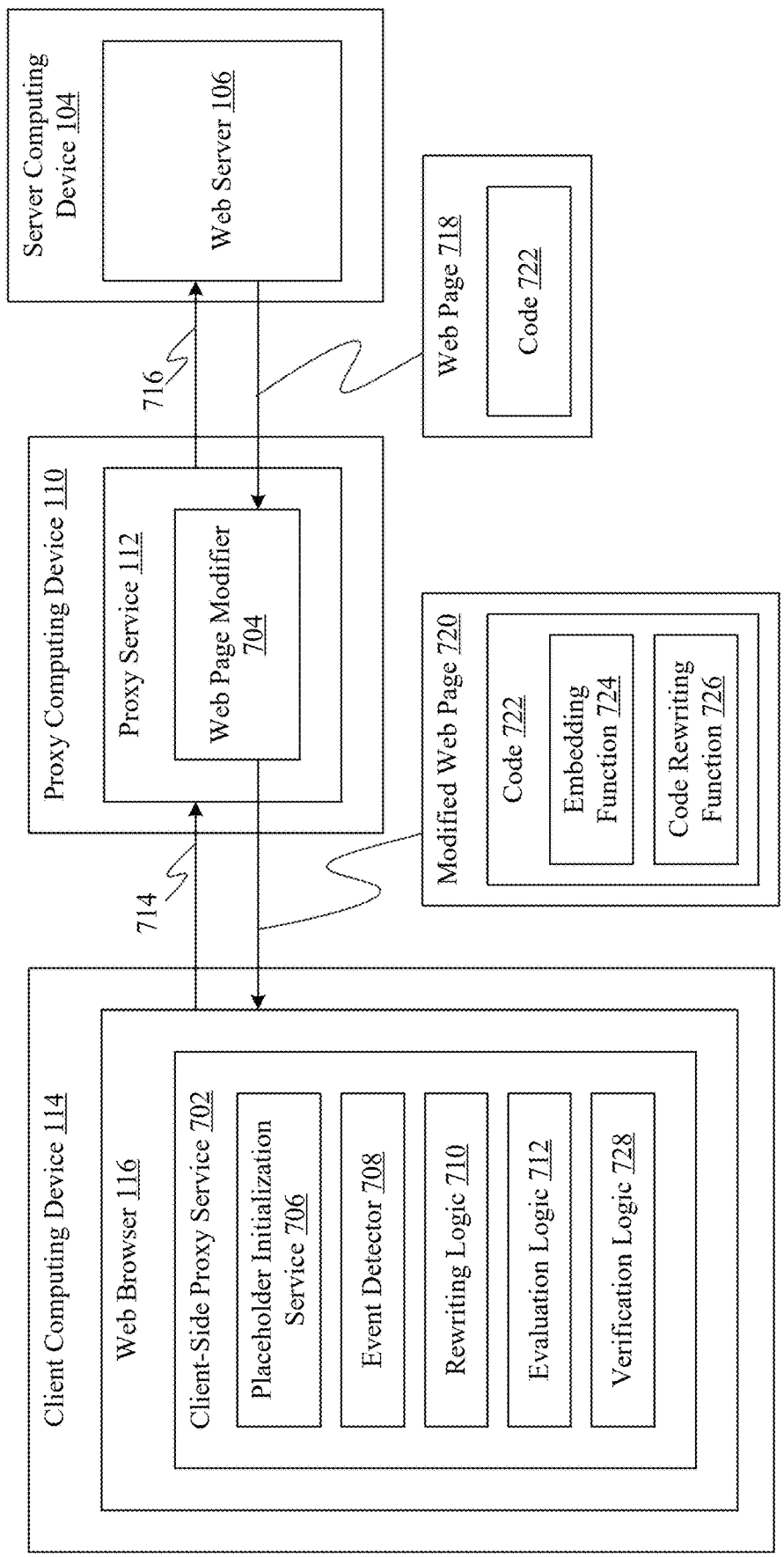

FIG. 7 is a block diagram of an example system in which a proxy computing device is interconnected between a client computing device and a server computing device, where the proxy computing device executes a proxy service, the client computing device executes a web browser comprising a client-side proxy service, and the server computing device executes a web server, in accordance with an embodiment.

Figure 8:
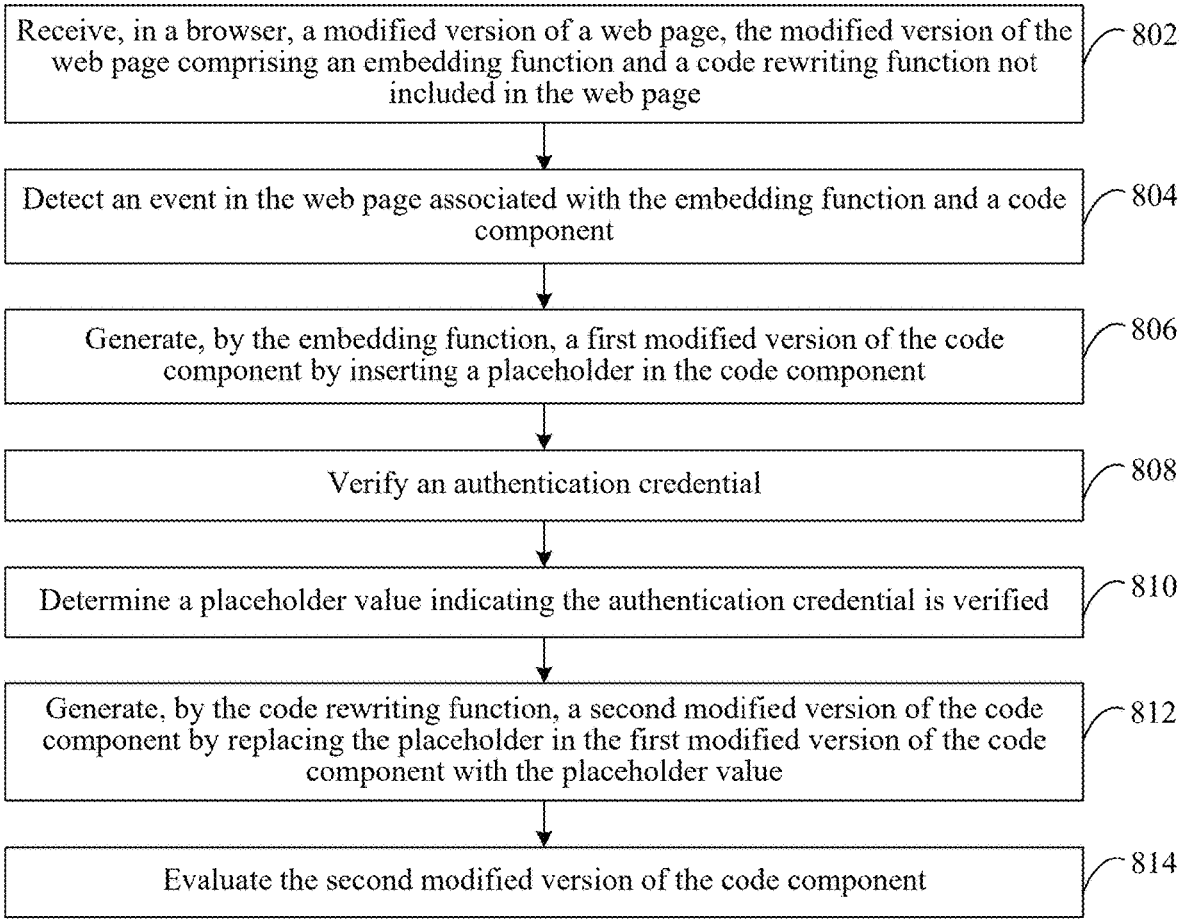

FIG. 8 depicts a flowchart of a process for modifying a resource by a client-side proxy service, in accordance with an embodiment.

Figure 9:
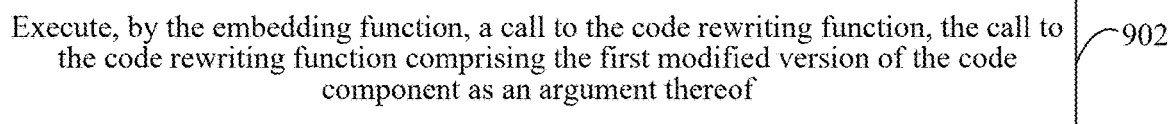

FIG. 9 depicts a flowchart of a process for generating a second modified version of a code component, in accordance with an embodiment.

Figure 10:
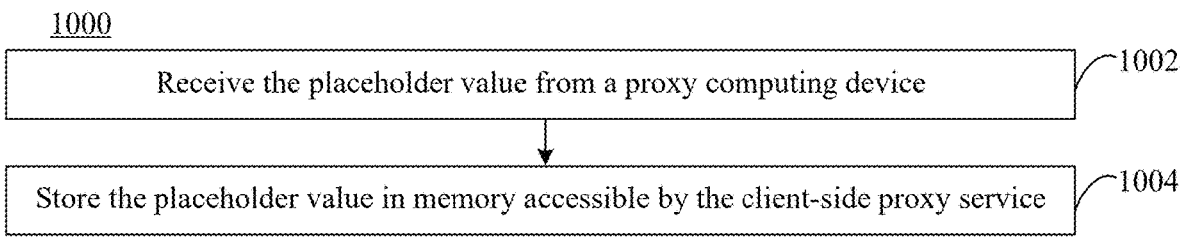

FIG. 10 depicts a flowchart of a process for storing a placeholder value, in accordance with an embodiment.

Figure 11:
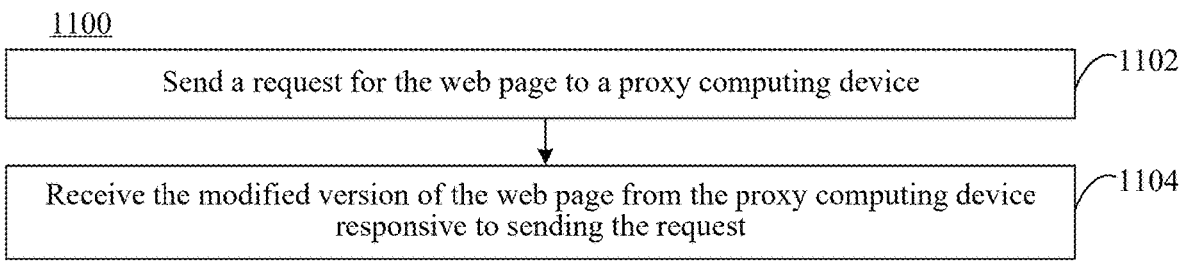

FIG. 11 depicts a flowchart of a process for requesting a web page, in accordance with an embodiment.

Figure 12:
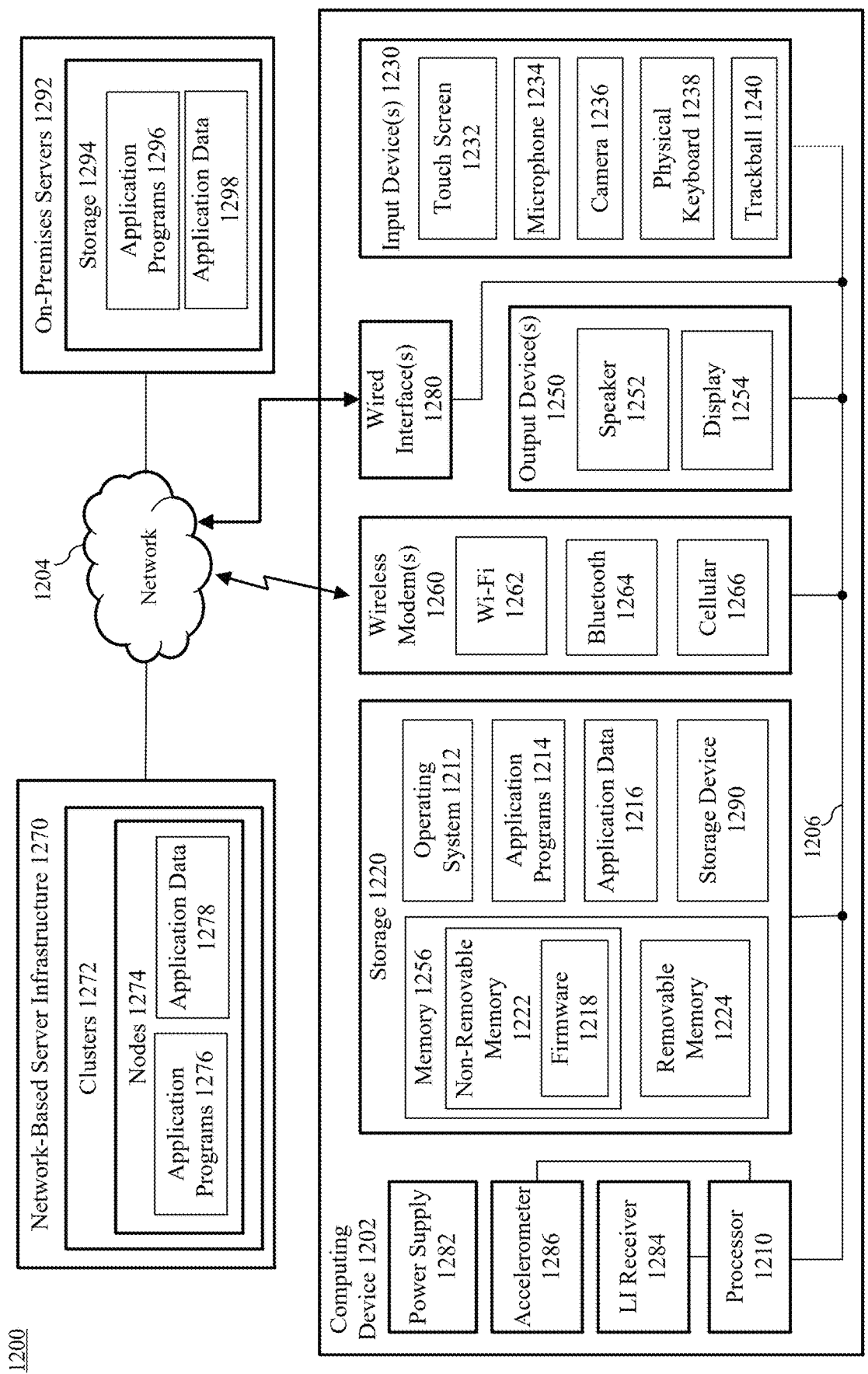

FIG. 12 is a block diagram of an example computing device that may be used to implement embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Some web proxies intercept transmissions between a web server and a client device and rewrite a portion of a resource (e.g., a web page) included in the transmission. For instance, a suffix proxy may rewrite navigation functions (e.g., JavaScript navigations) and Ajax actions in a web page to modify (e.g., suffix or un-suffix) URLs of target applications. As another example, a security proxy rewrites code in a resource to enforce security policies. For instance, a security proxy may rewrite code in a resource to detect actions performed in a client browser that should be evaluated according to a security policy (e.g., a file upload or download event that occurs in the client browser (e.g., without interaction with the web server)).

To rewrite code, a web proxy parses a resource received from a web server before the resource is passed to a web browser executing on a client device. The web proxy identifies code of interest and wraps the code to generate a modified resource. Parsing, identifying code of interest, and generating modified resources is a resource-intensive task that may consume a significant amount of time, particularly when the size of the code is large. This can adversely impact the ability of the web proxy to quickly deliver web pages. As a web proxy expands to more and more users, this task can become a significant bottleneck for the proxy.

Embodiments of the present disclosure implement inserting and replacing placeholders in code included in resources. For example, embodiments described herein include a proxy computing device, interconnected between a client computing device and a server computing device, that receives a resource from the server computing device. In an aspect of the present disclosure, the proxy computing device receives a resource from the server computing device. The proxy computing device identifies a code component included in the resource and generates a first modified version of the resource by inserting a placeholder in the identified code component. The proxy computing device stores the first modified version of the resource (e.g., in memory accessible to the proxy computing device). In a further aspect, the proxy computing device receives a request for the resource from the client computing device, the request including an authentication credential. The proxy computing device verifies the authentication credential and determines a first placeholder value indicating the authentication credential is verified. The proxy computing device retrieves the first modified version of the resource from the memory and generates a second modified version of the resource by replacing the placeholder with the first placeholder value. The proxy computing device transmits the second modified version of the resource to the first client computing device.

The techniques described herein provide a multi-step code rewriting process that comprises inserting placeholders into a resource (thereby generating a first modified version of the resource) and replacing the inserted placeholders with corresponding placeholder values (thereby generating a second modified version of the resource). Furthermore, the first modified version of the resource is stored in memory (e.g., a cache) accessible to a proxy service, thereby enabling the proxy service to retrieve (e.g., obtain or otherwise access) stored versions of the first modified version of the resource so that future rewrites do not have to parse the resource to identify code components (e.g., code of interest). Instead, future rewrites obtain the stored version of the resource and replace the placeholders with placeholder values that satisfy a request for the resource. Furthermore, a web proxy may store placeholder values for multiple clients, authentication sessions, regions, contexts, and other criteria described herein. In this context, the web proxy may dynamically replace placeholders of the stored version of the resource with placeholder values based on properties of the client computing device (or an application executing thereon, a user associated with the client computing device, a user account of the user, etc.).

Figure 1:
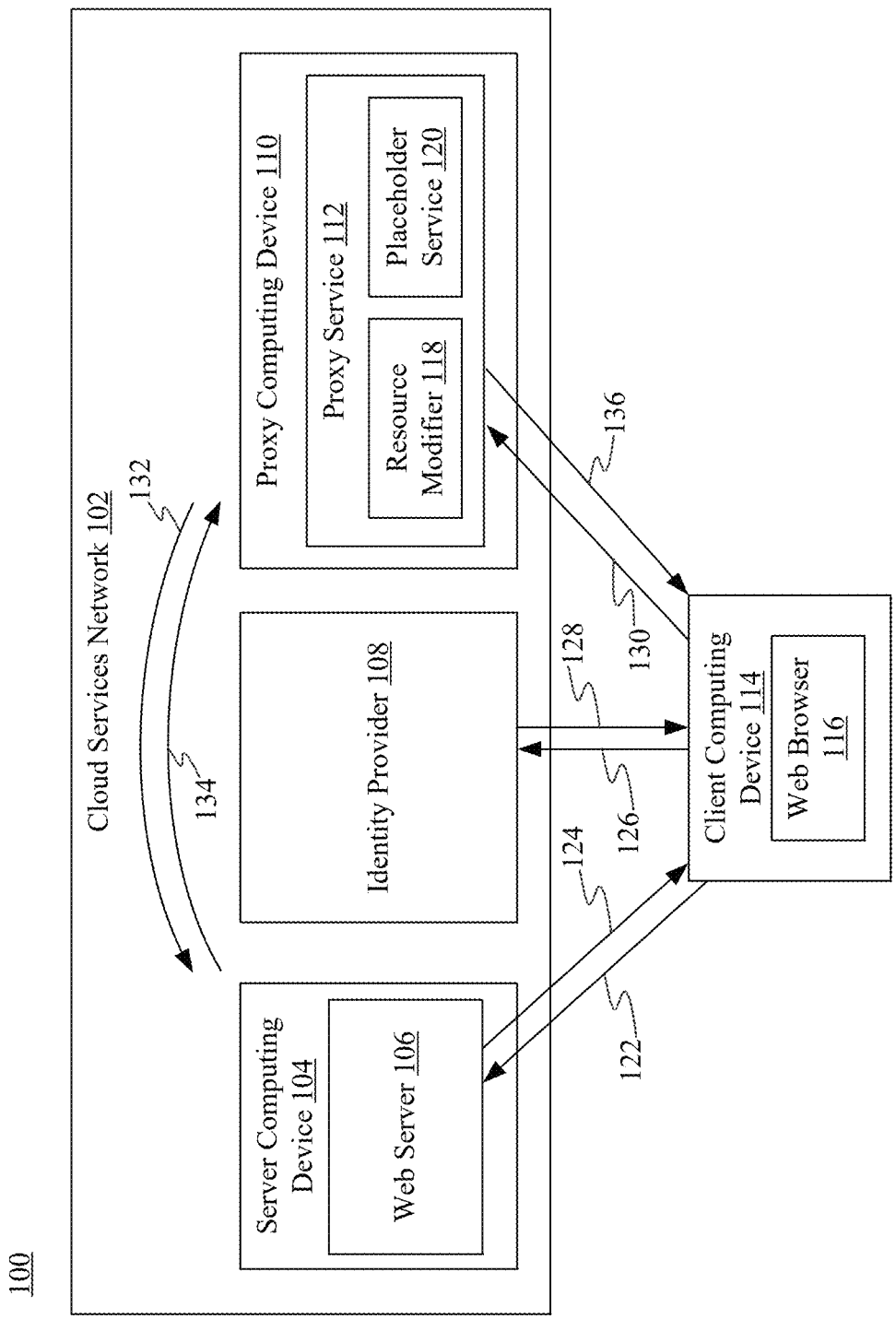
FIG. 1 is a block diagram of an example system that enables redirection of requests directed to a web server to a proxy service, in accordance with an embodiment.

To help illustrate the aforementioned systems and methods, FIG. 1 will now be described. In particular, FIG. 1 is a block diagram of a system 100 that enables redirection of requests directed to a web server to a proxy service, in accordance with an embodiment. As shown in FIG. 1, system 100 includes a cloud services network 102 and a client computing device 114. As further shown in FIG. 1, cloud services network 102 includes a server computing device 104, an identity provider 108, and a proxy computing device 110. Server computing device 104 is configured to execute a web server 106, proxy computing device 110 is configured to execute a proxy service 112, and client computing device 114 is configured to execute a web browser 116. These components of system 100 are described in further detail as follows.

In FIG. 1, web server 106 implements an application or service that is capable of serving resources to clients such as client computing device 114, wherein such resources include web pages. Although web server 106 is shown as being implemented on a single server computing device 104, in alternate embodiments web server 106 may be implemented on multiple server computing devices and/or one or more other computing devices.

Identity provider 108 is a computer-implemented system that creates, maintains, and manages identity information associated with users while providing authentication services to web services. Identity provider 108 may be implemented, for example, on one or more server computing devices.

Proxy service 112 is a computer-implemented system that monitors and manages interactions between the application or service implemented by web server 106 and users thereof. As shown in FIG. 1, proxy service 112 includes a resource modifier 118 and a placeholder service 120. Resource modifier 118 modifies a resource received from web server 106 to be provided to web browser 116 by inserting placeholders in the resource, as described elsewhere herein. Placeholder service 120 replaces placeholders in a modified resource with placeholder values, as described elsewhere herein. Although proxy service 112 is shown as being implemented on a single proxy computing device 110, in alternate embodiments proxy service 112 may be implemented on multiple proxy computing devices and/or one or more other computing devices. For instance, in accordance with an alternative embodiment, resource modifier 118 executes on a first proxy computing device and placeholder service 120 executes on a second proxy computing device.

Each component of cloud services network 102 and client computing device 114 may be communicatively connected via one or more networks (not pictured in FIG. 1). These one or more networks may include, for example and without limitation, one or more of a local area network (LAN), a wide area network (WAN), a personal area network (PAN), a private network, a public network, a packet network, a circuit-switched network, a wired network and/or a wireless network.

Client computing device 114 may be any type of computing device, including a stationary or mobile computing device. Examples of a stationary computing device include but are not limited to a desktop computer, a personal computer (PC), a video game console, or a smart appliance (e.g., a smart television). Examples of a mobile computing device include but are not limited to a smart phone, a laptop computer, a notebook computer, a tablet computer, a netbook, or a wearable computing device (e.g., a smart watch, a head-mounted device including smart glasses, etc.)

As depicted in FIG. 1, web browser 116 of client computing device 114 submits a request 122 to web server 106 of server computing device 104 that requests a resource thereof. In accordance with an embodiment, request 120 is submitted on behalf of a user of client computing device 114.

In response to receiving request 120, web server 106 determines that the user has not yet been authenticated and provides a response 124 to web browser 116 that causes web browser 116 to send a request 126 to identity provider 108 for user authentication. For instance, web server 106 in accordance with an embodiment redirects web browser 116 to identity provider 108 in response to determining that a required authentication credential (e.g., an authentication artifact (e.g., a token)) was not provided with request 122.

After receiving request 126, identity provider 108 determines based on an access policy whether web browser 116 should access the resource via proxy service 112. An access policy may outline which users, groups of users, and/or web services' network cloud traffic should be routed to proxy service 112 for monitoring and/or management. In accordance with an embodiment, an information technology (IT) administrator for an organization sets access policies for applications and users of client computing devices that access a computer network of the organization. As a non-limiting example, suppose identity provider 108 evaluates a user's login (e.g., username and password) and determines that there is a policy associated with that user that indicates that the user should access the resource via proxy service 112.

Identity provider 108 further authenticates the user associated with request 126 and creates an authentication credential (e.g., a token) that can be used by web server 106 to determine whether the user should be granted access to the resource. In some embodiments, during authentication, a user is prompted by identity provider 108 to provide his or her user login credentials. After determining that web browser 116 should access the resource via proxy service 112 (e.g., a security proxy that enforces access policies), identity provider 108 sends a response 128 to web browser 116 that includes an encrypted version of the authentication credential and that redirects web browser 116 to send a request 130 to proxy service 112 that includes such encrypted authentication credential. In accordance with an embodiment, the authentication credential (or the encrypted authentication credential) is signed with a private key of identity provider 108.

Responsive to receiving redirected request 130, proxy service 112 decrypts the authentication artifact (and optionally determines if a signature of the authentication credential is valid (e.g., using a public key corresponding to the private signing key)) and generates a corresponding request 132 that includes the decrypted authentication artifact and provides request 132 to web server 106. In accordance with an embodiment, request 132 includes a placeholder value (or a plurality of placeholder values). Alternatively, proxy service 112 (or placeholder service 120) determines a placeholder value (or a plurality of placeholder values) based on analyzing request 132 and/or data included in request 132. Proxy service 112 in accordance with an embodiment stores the placeholder value in memory accessible by the service (not shown in FIG. 1). Additional details regarding receiving, determining, and storing placeholder values are discussed with respect to FIGS. 4A and 4B, as well as elsewhere herein.

Web server 106 may grant or deny access to the resource based on the authentication artifact. If access is granted, web server 106 may interpret request 132, generate a response 134 to request 132, and issue response 134 to proxy service 112. In some embodiments, response 134 may include a file stored on web server 106 or an output from a program executing on web server 106. In other embodiments, response 134 may include an error message if the request could not be fulfilled.

After receiving response 134, proxy service 112 may generate a response 136 (e.g., a response that includes a web page) and send response 136 to web browser 116. In response to receiving response 136, web browser 116 may interpret response 136 and display contents of response 136 (e.g., when response 136 includes a web page) on a window of web browser 116 for the user of client computing device 114. Response 136 may be the same as response 134 or a response modified by proxy service 112. For instance, resource modifier 118 in accordance with an embodiment modifies a resource (e.g., a web page) included in response 134 by identifying a code component included in the resource and inserting a placeholder in the identified code component. Placeholder service 120 replaces the placeholders inserted by resource modifier 118 with a first placeholder value to generate a second modified version of the resource and proxy service 112 includes the second modified version of the resource in response 136. Further details regarding modifying resources are discussed with respect to FIGS. 2-4A and 4C, as well as elsewhere herein. In accordance with another embodiment, and as described with respect to FIGS. 7-11, proxy service 112 includes placeholder values, an embedding function and/or a code rewriting function in response 136.

Any further requests related to accessing resources of web server 106 and originating in web browser 116 during the proxy session of the user may be directed to proxy service 112, and any responses generated by proxy service 112 to the further requests may be issued to web browser 116 by proxy service 112 on behalf of web server 106.

In some embodiments, proxy service 112 may be configured to act as a suffix proxy. Suffix proxies enable a user to access content via a proxy server by appending the name of the proxy server to a domain URL of the requested content. For example, if a web page identifies a content source using the domain URL "targetapplication.com", proxy service 112 may rename the domain URL such that the renamed domain URL instead appears as domain URL "targetapplication.com.proxyserver".

Figure 2:
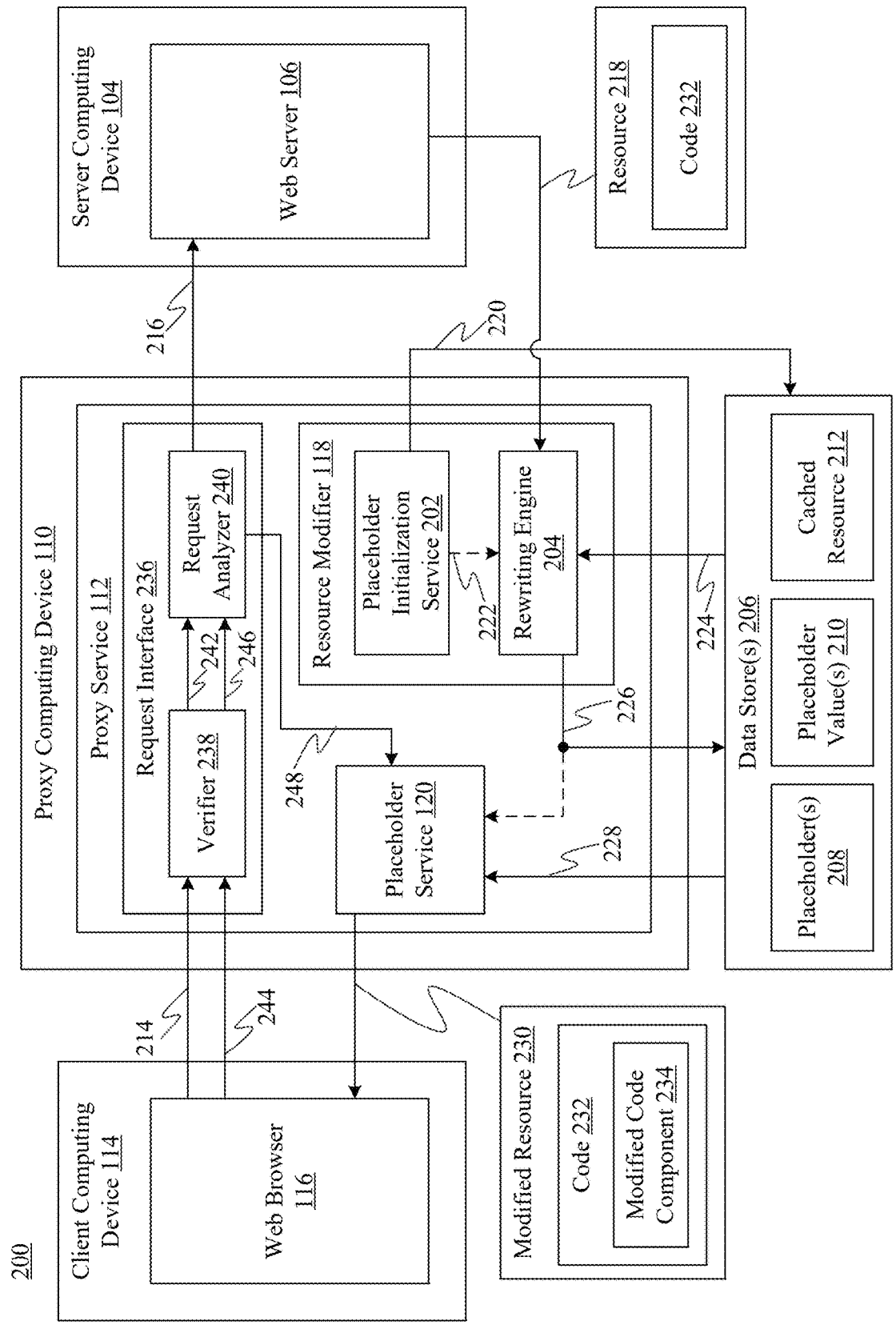
FIG. 2 is a block diagram of an example system in which a proxy computing device is interconnected between a client computing device and a server computing device, where the proxy computing device executes a proxy service, the client computing device executes a web browser, and the server computing device executes a web server, in accordance with an embodiment.
Figure 3:
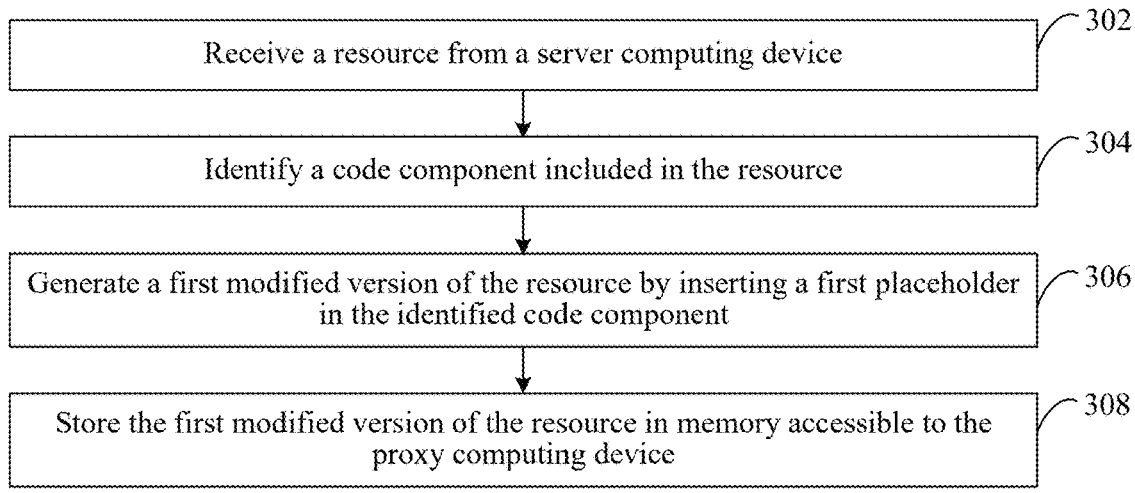
FIG. 3 depicts a flowchart of a process for generating and storing a modified version of a resource, in accordance with an embodiment.

In embodiments, and as discussed with respect to FIGS. 2 and 3 as well as elsewhere herein, proxy service 112 stores modified versions of resources (e.g., the resource included in response 134) generated by resource modifier 118 in memory accessible to proxy service 112 (not shown in FIG. 1). By storing modified versions generated by resource modifier 118, proxy service 112 rewrites the resource in response to future requests without having to parse the resource to identify code components. Instead, placeholder service 120 retrieves the stored modified version and replaces the placeholder(s) with placeholder values that satisfy the future request. Furthermore, as discussed further with respect to FIGS. 5 and 6, proxy service 112 may dynamically replace placeholders of the stored version of the resource with placeholder values for multiple client computing devices.

III. Example Proxy Server Embodiments

As described herein, some embodiments of proxy services comprise a resource modifier and placeholder modifier for modifying resources to be provided to a web browser. To help further illustrate these features of proxy services in accordance with embodiments, FIG. 2 will now be described. In particular, FIG. 2 is a block diagram of an example system 200 ("system 200" hereinafter) in which a proxy computing device is interconnected between a client computing device and a server computing device, where the proxy computing device executes a proxy service, the client computing device executes a web browser, and the server computing device executes a web server, in accordance with an embodiment. As shown in FIG. 2, system 200 includes: client computing device 114 (comprising web browser 116), proxy computing device 110 (comprising proxy service 112), and server computing device 104 (comprising web server 106), as described above with respect to FIG. 1, and a data store 206. As further shown in FIG. 2, proxy service 112 comprises resource modifier 118 and placeholder service 120, as described above with respect to FIG. 1, and a request interface 236. As also shown in FIG. 2, resource modifier 118 comprises a placeholder initialization service 202 and a rewriting engine 204, and request interface 236 comprises a verifier 238 and a request analyzer 240. As also shown in FIG. 2, proxy service 112 receives a resource 218 and outputs a modified resource 230. Resource 218 includes code 232 while modified resource 230 includes code 232 with a modified code component 234, as described elsewhere herein. In accordance with an embodiment, and as further discussed with respect to FIGS. 7-11, modified resource 230 includes one or more placeholder values, an embedding function, and/or a code rewriting function.

As discussed above in reference to FIG. 1, proxy computing device 110 is communicatively interconnected between client computing device 114 and server computing device 104 via one or more networks (not pictured in FIG. 2). Proxy computing device 110 in accordance with an embodiment establishes itself as an intermediary for client computing device 114 and server computing device 104 in accordance with the process described above in reference to FIG. 1.

Data store 206 stores one or more placeholder(s) 208 ("placeholders 208" herein), one or more placeholder value(s), and a cached resource 212. As shown in FIG. 2, data store 206 is external to proxy computing device 110; however, it is also contemplated that all or a portion of data store 206 may be internal to proxy computing device 110.

For illustrative purposes, system 200 is described with respect to FIG. 3. FIG. 3 depicts a flowchart 300 of a process for generating and storing a modified version of a resource, in accordance with an embodiment. System 200 of FIG. 2 may operate according to flowchart 300 in embodiments. Not all steps of flowchart 300 need be performed in all embodiments. Further structural and operational embodiments will be apparent to persons skilled in the relevant art(s) based on the following descriptions of FIGS. 2 and 3.

Flowchart 300 begins at step 302. In step 302, a resource is received from a server computing device. For instance, proxy service 112 of FIG. 2 executing on proxy computing device 110 receives resource 218 from web server 106 of server computing device 104. Proxy service 112 may receive resource 218 in a variety of ways. For instance, as shown in FIG. 2, request interface 236 of proxy service 112 receives a request 214 from web browser 116 (e.g., in response to an identity provider having determined based on an access policy that request 214 should be redirected to proxy service 112, and/or during an active proxy session between web browser 116 and proxy service 112). In accordance with an embodiment, request 214 comprises an authentication credential (e.g., an authentication token issued to client computing device 114 by identity provider 108 of FIG. 1). In this context, responsive to receiving request 214, verifier 238 verifies the authentication credential. If the authentication credential is verified, verifier 238 provides a signal 242 to request analyzer 240 indicating the authentication credential is verified. In accordance with an embodiment, signal 242 comprises request 214, the authentication credential, an indication the authentication credential is verified, an indicator of the requested resource (e.g., a resource identifier (ID)), and/or any other information associated with request 214 and/or the verification of credentials included therein. Request analyzer 240 analyzes signal 242 to determine if the requested resource corresponds to a stored modified version of the resource. Additional details regarding determining that a requested resource corresponds to a stored modified version of the resource are discussed with respect to FIGS. 4A and 4C, as well as elsewhere herein.

If request analyzer 240 determines that the resource requested in request 214 does not correspond to a stored modified version of the resource, proxy service 112 issues a corresponding request 216 to web server 106, requesting that web server 106 fulfill request 214. Proxy service 112 receives a response corresponding to request 216 from web server 106 that comprises resource 218. As shown in FIG. 2, resource 218 comprises code 232 (e.g., JavaScript code). In accordance with an embodiment, code 232 includes one or more code components for implementing various actions as described elsewhere herein.

In step 304, a code component included in the resource is identified. For instance, rewriting engine 204 of resource modifier 118 receives resource 218, analyzes code 232, and identifies a code component included in code 232. In accordance with an embodiment, rewriting engine 204 identifies a code component of interest. Example code components of interest include, but are not limited to, a code component that corresponds to a URL to be rewritten, a code component that corresponds to credentials to be included therein, a code component that corresponds to a context to be included therein, and/or a code component that implements an action of interest to proxy service 112. Example actions of interest include, but are not limited to, navigation actions, file download actions, file upload actions, asynchronous Javascript and XML (AJAX) actions, and/or any other action that may be of interest to proxy service 112. In accordance with an embodiment, rewriting engine 204 identifies multiple code components of interest.

Rewriting engine 204 identifies code components in various ways, in embodiments. For instance, rewriting engine 204 in accordance with an embodiment extracts code components from code 232 of resource 218 and organizes the code components into an abstract syntax tree (AST). An AST is a tree representation of the abstract syntactic structure of code (e.g., code 232) written in a programming language. Each node of the AST may denote a construct occurring in the code, and connections between nodes may signify dependencies between such constructs. Rewriting engine 204 traverses the AST to identify nodes that are of interest to proxy service 112 from a management or monitoring perspective and thus targeted for replacement with wrapped code components, as described elsewhere herein.

In accordance with an embodiment, rewriting engine 204 identifies components by identifying static import statements. As a non-limiting running example, suppose code 232 comprised the following code:

| 1 | import 'https://a.b.com/module.js'; |
|---|---|
| 2 | import {a, b} from 'https://a.b.com/module.js'; |
| 3 | import myDefault, * as myModule from 'https://a.b.com/module.js?qs=1'; |

In this example, rewriting engine 204 identifies each of the static "import" statements as the identified code component in step 304.

In step 306, a first modified version of the resource is generated by inserting a first placeholder in the identified code component. For example, rewriting engine 204 generates a first modified version of resource 218 which is modified resource 226 by inserting one or more placeholders in the code component identified in step 304. Placeholders correspond to information to be inserted into the identified code component, as described elsewhere herein (e.g., with respect to FIGS. 4-6, FIG. 8, and elsewhere herein). Examples of placeholders include, but are not limited to, suffix placeholders that specify a suffix (e.g., a domain) to be inserted into an identified code component, a credential placeholder that specifies an authorization credential (e.g., a token) to be inserted into an identified code component, and a context placeholder that specifies a script context (e.g., a context corresponding to the type of resource, a context corresponding to an action that triggered the request (e.g., a user clicking a button in a graphic interface of web browser 116, a user mousing over an element presented in a graphic interface of web browser 116, a navigation action within web browser 116, a refresh action within web browser 116, and/or any other type of action that would trigger a request for a resource to be transmitted to proxy service 112), a context corresponding to the type of web browser that web browser 116 is, a type of the code component included in the resource (e.g., a script, cascading style sheets (CSS) code, binary code, HTML code, JavaScript code, etc.), and/or any other type of context associated with client computing device 114, web browser 116, proxy service 112, the proxy session between web browser 116 and proxy service 112, a user of client computing device 114, and/or resource 218) to be inserted into an identified code component. In accordance with an embodiment, placeholders are variables representative of the information they replace.

Rewriting engine 204 may be configured to identify code components and insert placeholders in the identified code components in various ways. For instance, as shown in FIG. 2, placeholder initialization service 202 determines placeholder configuration data 220 and stores the data in data store 206. In accordance with an embodiment, placeholder configuration data 220 specifies rules for inserting a placeholder in a code component, as well as what the placeholder is. For instance, suppose placeholder configuration data 220 specifies how a particular placeholder is represented in a code language. In this example, the representation of the placeholder is stored as a placeholder of placeholders 208. For example, in accordance with an embodiment a suffix placeholder is represented as "${SUFFIX_MCAS}", a credential placeholder is represented as "${TOKEN_MCAS}", and a script context placeholder is represented as "$CTX_MCAS". Rewriting engine 204 obtains the representations of the placeholders from data store 206 via signal 224. Alternatively, placeholder initialization service 202 provides placeholder configuration data 220 (including the representations of the placeholders) to rewriting engine 204 via configuration signal 222. In accordance with an embodiment, placeholder initialization service 202 is preprogrammed with the representations of placeholders. In accordance with an embodiment, placeholder initialization service 202 receives the representations of placeholders from an admin computing device associated with proxy service 112. In accordance with an embodiment, placeholder initialization service 202 includes a plurality of representations of placeholders and generates placeholder configuration data 220 to include a subset of the plurality of representations of placeholders based on which placeholder values are determined for a particular proxy session. Additional details regarding determining placeholder values are described with respect to FIG. 4A, as well as elsewhere herein.

Continuing the non-limiting example described with respect to step 304, suppose rewriting engine 204 inserts a suffix code, a credential placeholder, and a context placeholder in the static import statements identified in step 304. In this context, the code components of modified resource 226 are represented as:

```
1    import a from
         'https://a.b.com.${SUFFIX_MCAS}/module.js?McasCtx=$
         {CTX_MCAS}&McasUserAuth=${TOKEN_MCAS}';
2    import {a, b} from
         'https://a.b.com.${SUFFIX_MCAS}/module.js?McasCtx=$
         {CTX_MCAS}&McasUserAuth=${TOKEN_MCAS}';
3    import myDefault, * as myModule from
         'https://a.b.com.${SUFFIX_MCAS}/module.js?qs=1&Mcas
         Ctx=${CTX_MCAS}&McasUserAuth=${TOKEN_MCAS}';
```

In this example, rewriting engine 204 inserts a suffix placeholder "${SUFFIX_MCAS}", a context placeholder "${CTX_MCAS}", and a credential placeholder "${TOKEN_MCAS}" into each URL of each import statement.

In accordance with an embodiment, rewriting engine 204 generates modified resource 226 by replacing certain code components of code 232 with corresponding wrapped code components and by including an embedding and/or code rewriting function into the resource. Additional details regarding wrapped code components, embedding functions, and code rewriting functions are described with respect to FIGS. 7-9, as well as elsewhere herein.

In step 308, the first modified version of the resource is stored in memory accessible to the proxy computing device. For instance, rewriting engine 204 of FIG. 2 stores modified resource 226 as cached resource 212 in (e.g., a cache of) data store 206. By storing modified resource 226, proxy service 112 enables retrieving modified resource 226 in response to future requests (e.g., from web browser 116, from other web browsers of client computing device 114, or from web browsers executing on other computing devices, not shown in FIG. 2) for resource 218. For instance, by utilizing a "suffix placeholder," proxy service 112 may access the stored (e.g., cached) version of modified resource 226 to satisfy requests that require different suffixes than the request 214. Further, by utilizing a "credential placeholder," proxy service 112 may access the stored version of modified resource 226 to satisfy request for different authentication sessions (e.g., different users with different credentials, different sessions with different session tokens, and/or the like). Additional details regarding accessing stored modified resources are discussed with respect to FIGS. 4A, 5 and 6, as well as elsewhere herein.

Subsequent to storing modified resource 226, proxy service 112 fulfills request 214. For instance, placeholder service 120 replaces placeholders in modified resource 226 to generate modified resource 230 and transmits modified resource 230 to web browser 116. Additional details regarding replacing placeholders and transmitting modified resources are discussed further with respect to FIG. 4A, as well as elsewhere herein.

Figure 4A:
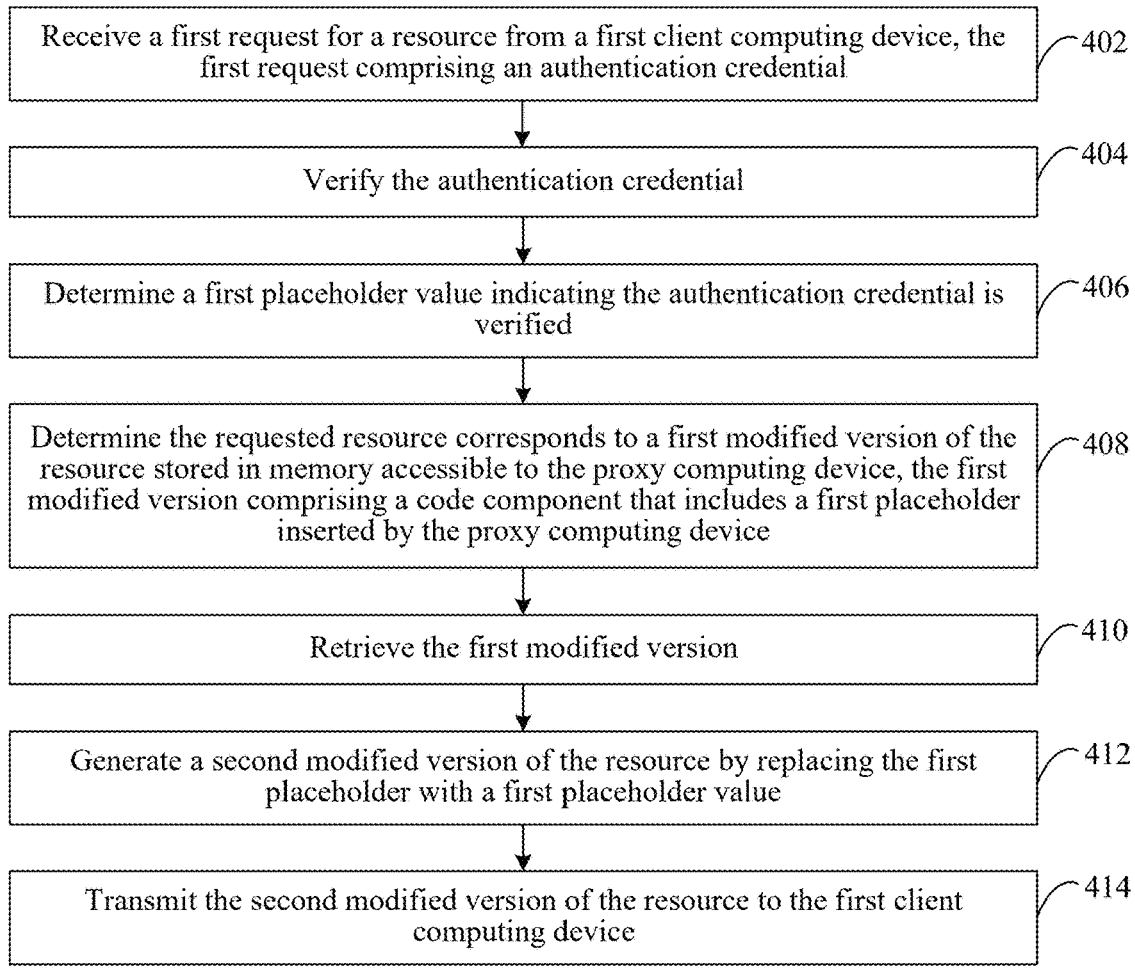
FIG. 4A depicts a flowchart of a process for modifying a stored modified version of a resource, in accordance with an embodiment.

As noted above, proxy service 112 further modifies modified versions of resources generated by resource modifier 118 to fulfill requests from web browsers (e.g., web browser 118) of client computing device (e.g., client computing device 114). Proxy service 112 may modify modified versions of resources in various ways. For example, FIG. 4A depicts a flowchart 400 of a process for determining a placeholder value, in accordance with an embodiment. System 200 of FIG. 2 may operate according to flowchart 400 in embodiments. Not all steps of flowchart 400 need be performed in all embodiments. Further structural and operational embodiments will be apparent to persons skilled in the relevant art(s) based on the following descriptions of FIGS. 2 and 4A.

Flowchart 400 begins with step 402. In step 402, a first request for a resource is received from a first client computing device, the first request comprising an authentication credential. For example, proxy service 112 of FIG. 2 receives request 244 for resource 218 from web browser 116 executing on client computing device 114, request 244 comprising an authentication credential. In accordance with an embodiment, proxy service 112 receives request 244 in response to an identity provider (e.g., identity provider 108 of FIG. 1) having determined based on an access policy that request 244 should be redirected to proxy service 112. In accordance with another embodiment, proxy service 112 receives request 244 during an active (e.g., already established) proxy session between web browser 116 and proxy service 112. For instance, request 244 may be a request received subsequent to request 214 in the same proxy session. In accordance with an embodiment, the authentication credential is an authentication token provided to web browser 116 by identity provider 108 (e.g., in response to authentication of a user or service of web browser 116). In accordance with a further embodiment, authentication token is signed with a private key of identity provider 108.

In step 404, the authentication credential is verified. For example, verifier 238 of FIG. 2 verifies the authentication credential included in request 244. In accordance with an embodiment, verifier 238 verifies the authentication credential satisfies a security policy of proxy service 112. In accordance with an embodiment, verifier 238 verifies the authentication credential by validating a signature of the authentication credential (e.g., using a public key of identity provider 108 that corresponds to the private key of identity provider 108). As shown in FIG. 2, verifier 238 provides a signal 246 to request analyzer 240 and flowchart 400 continues to step 406. In accordance with an embodiment, signal 246 comprises request 244, the authentication credential, an indication the authentication credential is verified, a resource ID of resource 218, and/or any other information associated with request 244 and/or verification of credentials included therein.

In step 406, a first placeholder value is determined, the first placeholder value indicating the authentication credential is verified. For example, request analyzer 240 of FIG. 2 determines placeholder values based on request 244 (e.g., as included in signal 246). For instance, request analyzer 240 may analyze request 244 (and/or any other data included in signal 246) to determine placeholder values based on information included in request 244, the web browser that transmitted the request (i.e., web browser 116), the computing device executing the web browser (i.e., client computing device 114), a user associated with web browser 116, and/or data associated with the active proxy session between web browser 116 and proxy service 112. For example (e.g., and in response to verification of the authentication credential included in request 244), request analyzer 240 in accordance with an embodiment determines an authentication string based on the authentication credential (e.g., an authentication token signed by identity provider 108 of FIG. 1). As discussed further with respect to FIG. 4C, request analyzer 240 may determine placeholder values other than (or in addition to) credential placeholder values. For instance, request analyzer 240 in accordance with an embodiment analyzes data associated with establishing a proxy session between web browser 116 and proxy service 112 included in request 214 and determines a suffix placeholder value corresponding to the proxy session.

In step 408, a determination that the requested resource corresponds to a first modified version of the resource is made. The first modified version of the resource stored in memory accessible to the proxy computing device. The first modified version of the resource comprising a code component that includes a first placeholder inserted by the proxy computing device. For example, request analyzer 240 of FIG. 2 analyzes request 244 (and/or any other data included in signal 246) to determine if the resource requested in request 244 corresponds to a first modified version of a resource (e.g., cached resource 212 and/or other previously modified resources generated by rewriting engine 204) stored in data store 206. In accordance with an embodiment request analyzer 240 compares a resource ID of the requested resource to resource IDs of modified versions of resources stored in data store 206. As a non-limiting running example, suppose request 244 comprises a resource ID of requested resource 218 and cached resource 212 includes the resource ID of resource 218. In this example, request analyzer 240 accesses data store 206 to compare the resource ID of stored resources (including cached resource 212) to the resource ID included in request 244. If no match is made, request analyzer 240 issues a request to web server 106 (e.g., request 216) as described with respect to step 302 of flowchart 300 of FIG. 3. However, if a match is made, request analyzer 240 provides a match signal 248 to placeholder service 120 and flowchart 400 continues to step 410. In accordance with an embodiment, match signal 248 comprises placeholder values determined in step 406.

In step 410, the first modified version is retrieved. For example, placeholder service 120 of FIG. 2 retrieves the first modified version of resource 218 (e.g., modified resource 226 stored in data store 206 as cached resource 212) from data store 206. In accordance with an embodiment, and as shown in FIG. 2, placeholder 120 accesses data store 206 in response to receiving match signal 248 and receives the first modified version of the resource via signal 228. In accordance with an embodiment, data store 206 provides signal 228 to placeholder service 120 in response to a resource request from placeholder service 120 (not shown in FIG. 2). In accordance with an alternative embodiment, request analyzer 240 retrieves the first modified version of the resource from data store 206 and includes the retrieved version in match signal 248.

In step 412, a second modified version of the resource is generated by replacing the first placeholder with the first placeholder value. For instance, placeholder service 120 of FIG. 2 generates a second modified version of resource 218 which is modified resource 230 by replacing a placeholder in modified resource 226 (e.g., retrieved via signal 228 in step 410) with a first placeholder value. As shown in FIG. 2, code 232 of modified resource 230 comprises modified code component 234. In this context, modified code component 234 comprises the first placeholder value inserted by placeholder service 120. In accordance with an embodiment, placeholder service 120 selects the placeholder value to replace the placeholder with based on proxy service 112, a user account of client computing device 114, web browser 116, and/or any other data associated with a particular proxy session between web browser 116 and proxy service 112 and/or a policy of proxy service 112. For instance, in accordance with an embodiment, match signal 248 comprises the first placeholder value determined by resource analyzer 240 in step 406. In this context, placeholder service 120 replaces the first placeholder in modified resource 226 with the first placeholder value determined in step 406. Thus, modified resource 230 indicates the authentication credential included in request 244 is verified.

As shown in FIG. 2, placeholder service 120 obtains the first placeholder value via match signal 248. Alternatively, placeholder service 120 obtains the first placeholder value via signal 228 from data store 206 (e.g., in addition to modified resource 226). In this context, the placeholder value is a placeholder value of the placeholder in modified resource 226 stored in data store 206 as (e.g., a portion of) placeholder values 210. In accordance with an embodiment, placeholder values 210 are stored in data store 206 by request analyzer 240 (e.g., as part of the analysis of signal 246 and/or request 244, as described with respect to step 406). In accordance with an alternative embodiment, placeholder initialization service 202 determines and stores placeholder values as placeholder values 210 in data store 206 (e.g., as part of placeholder configuration data 220). Additional details regarding storing placeholder values are described with respect to FIG. 4B.

Continuing the non-limiting example described with respect to steps 304 and 306 of flowchart 300 of FIG. 3, suppose proxy service 112 includes a security proxy service that verifies authentication credentials included in requests from web browsers are valid (e.g., in accordance with the process described with respect to steps 404 and 406). In this example, the first placeholder value determined in step 406 is an authentication string "auth123" indicating the authentication credential is verified. Further suppose, in this example, that proxy service 112 includes a suffix service that adds a ".mcas.ms" suffix to URLs of web pages transmitted to web browser 116 and a code of modified resource 230 is to be evaluated with a script context "ctx20". In this context, the code of modified resource 230 is represented as:

```
1   import a from
        'https://a.b.com.mcas.ms/module.js?McasCtx=ctx20&Mcas
        UserAuth=auth123';
2   import {a, b} from 'https://a.b.com.
        mcas.ms/module.js?McasCtx=ctx20&McasUserAuth=auth123';
3   import myDefault, * as myModule from
        'https://a.b.com.mcas.ms/module.js?qs=1&McasCtx=ctx
        20&McasUserAuth=auth123';
```

In this example, placeholder service 120 replaces the placeholders inserted in modified resource 226 with placeholder values corresponding to the ".mcas.ms" suffix, the authentication string representative of the authentication token "auth123", and the "ctx20" context.

In step 414, the second modified version of the resource is transmitted to the first client computing device. For example, placeholder service 120 of FIG. 2 transmits modified resource 230 to web browser 116 executing on client computing device 114.

Figure 4B:
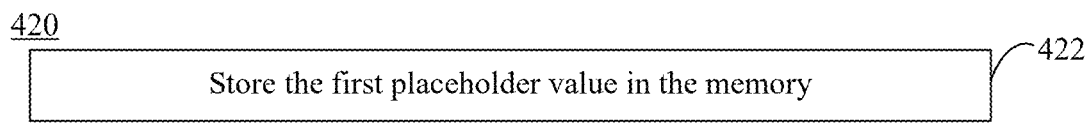
FIG. 4B depicts a flowchart of a process for storing a placeholder value, in accordance with an embodiment.

As discussed with respect to FIG. 4A, resource analyzer 240 in accordance with an embodiment provides determined placeholder values to placeholder service 120 via match signal 248. Alternative to (or in addition to) providing placeholder service 120 determined placeholder values, request analyzer 240 may store determined placeholder values in memory, e.g., as placeholder values 210. For instance, placeholder initialization service 202 may store placeholder values according to FIG. 4B. FIG. 4B depicts a flowchart 420 of a process for storing a placeholder value, in accordance with an embodiment. System 200 of FIG. 2 may operate according to flowchart 420 in embodiments. Flowchart 420 need not be performed in all embodiments. Further structural and operational embodiments will be apparent to persons skilled in the relevant art(s) based on the following descriptions of FIGS. 2 and 4B.

Flowchart 420 comprises step 422. In step 422, the first placeholder value is stored in memory accessible by the proxy computing device. For example, request analyzer 240 of FIG. 2 stores a placeholder value determined in step 406 of FIG. 4A in data store 206 as a value of placeholder values 210 (e.g., via a storage signal not shown in FIG. 2). By storing placeholder values in this manner, placeholder service 120 is able to access the placeholder values when replacing placeholders to generate modified resources (e.g., modified resource 230 of FIG. 2) to provide to web browsers. For instance, suppose a placeholder value corresponds to an indication that an authentication credential is verified for a proxy session between web browser 116 and proxy service 112. By storing the placeholder in this manner, resource analyzer 240 does not have to determine the placeholder value for subsequent requests during the same proxy session, thereby reducing the resources required to respond to requests.

In embodiments, placeholder values 210 comprises placeholder values for a single client user in a single proxy session. Alternatively, placeholder values 210 comprises respective placeholder values for each proxy session between proxy service 112 and respective client computing devices (e.g., including client computing device 114 and other client computing devices not shown in FIG. 2). In this alternative context, sets of placeholder values 210 are stored in data store 206 where each set is associated with an identifier for a particular proxy session. In this manner, placeholder service 120 obtains a particular set of placeholder values based on a proxy session identifier included in a request received from the web browser (e.g., request 214 or request 244 received from web browser 116).

Figure 4C:
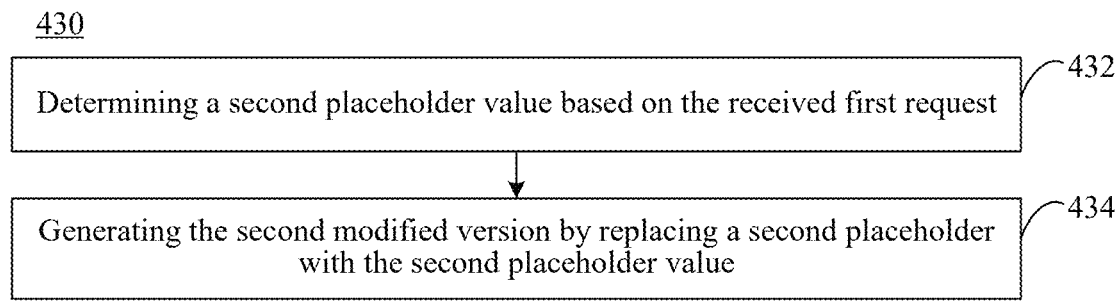
FIG. 4C depicts a flowchart of a process for modifying a resource, in accordance with an embodiment.

As discussed with respect to FIG. 4A, resource analyzer 240 and/or placeholder initialization service 202 determine placeholder values based on requests received from web browsers (e.g., request 214 or request 244 received from web browser 116). In particular, flowchart 400 of FIG. 4A is described with respect to determining a placeholder value that indicates the authentication credential is verified. However, it is also contemplated herein that other placeholder values may be determined (e.g., in addition to or in lieu of the placeholder value that indicates the authentication credential is verified), in embodiments. The other placeholder values may be determined and modified versions of resources may be further modified to include the other placeholders in various ways. For example, FIG. 4C depicts a flowchart 430 of a process for modifying a resource, in accordance with an embodiment. System 200 of FIG. 2 may operate according to flowchart 430 in embodiments. Flowchart 430 need not be performed in all embodiments. Further structural and operational embodiments will be apparent to persons skilled in the relevant art(s) based on the following descriptions of FIGS. 2 and 4C.

Flowchart 430 begins with step 432, which may be a further embodiment of step 406 of flowchart 400, as described with respect to FIG. 4A. In step 432, a second placeholder value is determined based on the received first request. For example, request analyzer 240 of FIG. 2 determines a second placeholder value based on request 244 (e.g., as included in signal 246). For instance, suppose the first placeholder value is a credential placeholder value indicating an authentication credential included in request 244 is verified, as described elsewhere herein. It is further contemplated herein that request analyzer 240 may determine additional placeholder values based on request 244 (e.g., suffix placeholder values and context placeholder values). Request analyzer 240 may determine any number of placeholder values, depending on the implementation. In reference to the running example described with respect to FIGS. 3 and 4A, request analyzer 240 determines the suffix placeholder value ".mcas.ms" and the context placeholder value "ctx20" based on request 244.

Flowchart 430 continues to step 434, which may be a further embodiment of step 412 of flowchart 400, as described with respect to FIG. 4A. In step 434, the second modified version is generated by replacing a second placeholder with the second placeholder value. For example, suppose modified resource 226 comprises a first placeholder (a credential placeholder) and a second placeholder. Placeholder service 120 of FIG. 2 generates modified resource 230 by replacing the first placeholder with the first placeholder value (as described with respect to step 412 of FIG. 4) and the second placeholder with the second placeholder value determined in step 432. For instance, in reference to the running example described with respect to FIGS. 3 and 4A, placeholder service 120 generates modified resource 230 by replacing credential placeholder "${TOKEN_MCAS}" with the authentication string "auth123", suffix placeholder "${SUFFIX_MCAS}" with the "mcas.ms" suffix, and context placeholder "${CTX_MCAS}" with the "ctx20" context.

Figure 5:
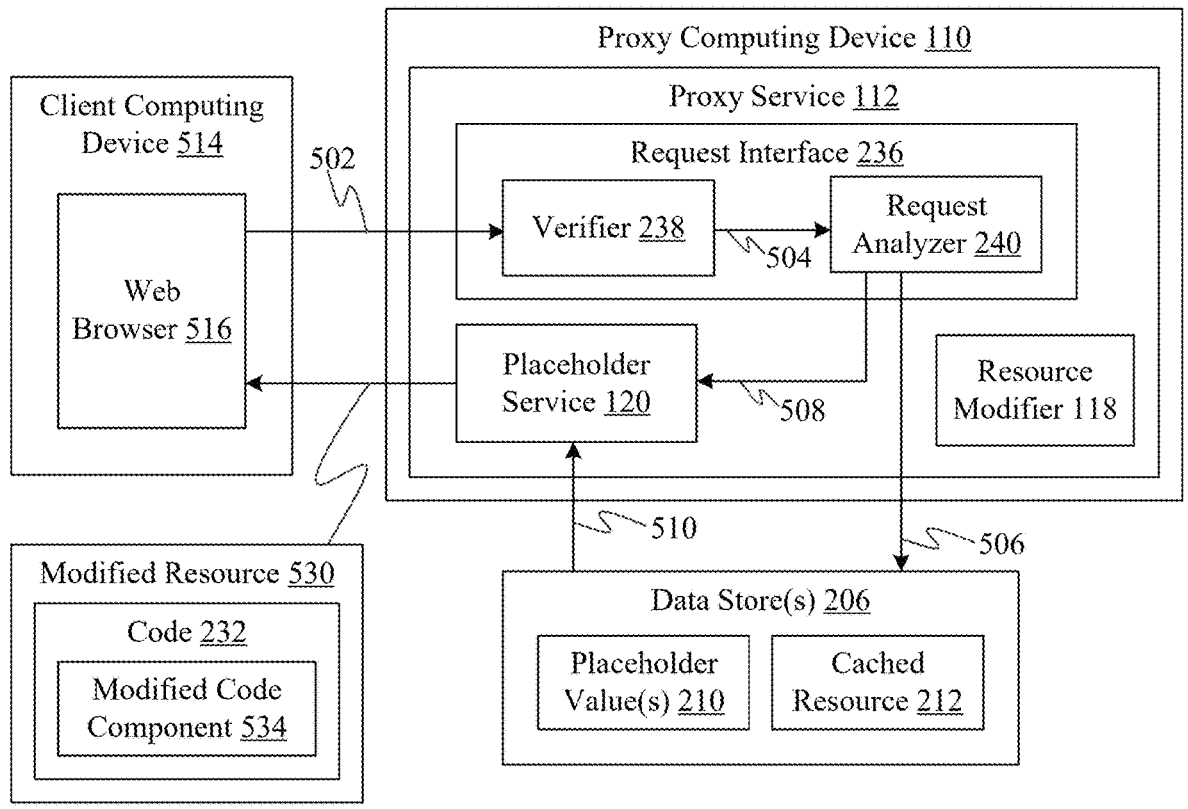
FIG. 5 depicts a block diagram of an example system that generates a modified resource from a stored resource, in accordance with an embodiment.

As noted elsewhere herein, rewriting engines of a proxy service stores modified versions of resources with placeholders in memory accessible to the proxy service so that future rewrites of the resource do not have to parse the resource to identify code components. Instead, the placeholder service of the proxy service accesses the cached resource and replaces the placeholders with appropriate placeholder values to generate a second modified version of the resource. Furthermore, a proxy service may store and/or determine placeholder values for multiple clients. Proxy services and components thereof may be configured to access and modify stored resources for multiple clients in various ways, in embodiments. For example, FIG. 5 depicts a block diagram of an example system 500 ("system 500" hereinafter) that generates a modified resource from a stored resource, in accordance with an embodiment. As shown in FIG. 5, system 500 comprises proxy computing device 110 (comprising proxy service 112 that includes resource modifier 118 (comprising placeholder initialization service 202 and rewriting engine 204, not shown in FIG. 5 for brevity), placeholder service 120, and request interface 236 (comprising verifier 238 and request analyzer 240) and data store 206 (comprising placeholder values 210 and cached resource 212) as described with respect to FIG. 2 and a client computing device 514 (executing a web browser 516). As also shown in FIG. 2, proxy service 112 receives a request 502 and outputs a modified resource 530. Modified resource 530 includes code 232 with a modified code component 534, as described elsewhere herein. In accordance with an embodiment, and as further discussed with respect to FIGS. 7-11, modified resource 530 includes one or more placeholder values, an embedding function, and/or a code rewriting function.

Client computing device 514 may be any type of computing device, as described with respect to client computing device 114 of FIG. 1. Client computing device 514 may be a computing device of the same user as client computing device 514, a computing device associated with the same organization as client computing device 514, and/or a computing device associated with a different user and/or organization than client computing device 514. As noted above and shown in FIG. 5, client computing device 514 executes web browser 516. In accordance with an embodiment, web browser 516 operates in a similar manner as web browser 116 of FIG. 1.

Proxy computing device 110 is communicatively interconnected between client computing device 514 and server computing device 104 (not pictured in FIG. 5) via one or more networks (not pictured in FIG. 5). Proxy computing device 110 in accordance with an embodiment establishes itself as an intermediary for client computing device 514 and server computing device 104 in a similar manner as described with respect to client computing device 114 and server computing device 104.

Figure 6:
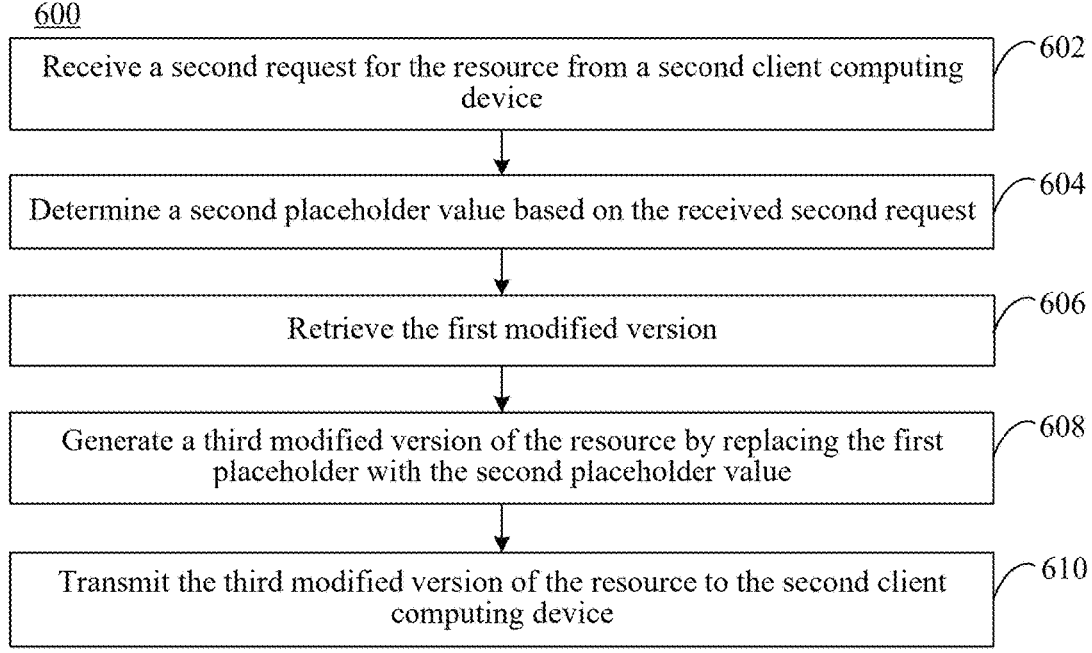
FIG. 6 depicts a flowchart of a process for modifying a stored modified version of a resource, in accordance with an embodiment.

For illustrative purposes, system 500 is described with respect to FIG. 6. FIG. 6 depicts a flowchart 600 of a process for modifying a stored modified version of a resource, in accordance with an embodiment. System 500 of FIG. 5 may operate according to flowchart 600 in embodiments. Not all steps of flowchart 600 need be performed in all embodiments. Further structural and operational embodiments will be apparent to persons skilled in the relevant art(s) based on the following descriptions of FIGS. 5 and 6.

Flowchart 600 begins with step 602. In step 602, a second request for the resource is received from a second client computing device. For example, verifier 238 of FIG. 5 receives request 502 for resource 218 (not shown in FIG. 5) from web browser 516 executing on client computing device 514. In accordance with an embodiment, proxy service 112 receives request 502 in response to an identity provider (e.g., identity provider 108 of FIG. 1) having determined based on an access policy that request 502 should be redirected to proxy service 112. In accordance with another embodiment, proxy service 112 receives request 502 during an active (e.g., already established) proxy session between web browser 516 and proxy service 112. In accordance with an embodiment, request 502 comprises an authentication credential (e.g., a token provided to web browser 516 via identity provider 108). In this context, verifier 238 verifies the authentication credential and generates signal 504 (e.g., in a similar manner described with respect to step 404 of FIG. 4A). In accordance with an embodiment signal 504 includes request 502, the authentication credential, an indication the authentication credential is verified, a resource ID of resource 218, and/or any other information associated with request 502 and/or verification of credentials included therein.

In step 604, a second placeholder value is determined based on the received second request. For example, request analyzer 240 of FIG. 5 determines a second placeholder value based on request 502 (e.g., as included in signal 504) in a manner similar to that described with respect to step 406 of flowchart 400, as described with respect to FIG. 4A. Alternatively, placeholder values are determined from requests previously received from web browser 516, or in other manners described elsewhere herein (e.g., by an admin user of proxy service 116). In accordance with an embodiment, request analyzer 240 of FIG. 2 stores the determined placeholder values in data store 206 via storage signal 506.

In step 606, the first modified version is retrieved. For example, as shown in FIG. 5, request analyzer 240 determines the resource requested by request 502 (i.e., resource 218) corresponds to modified resource 226 (stored in data store 206 as cached resource 212) in a manner similar to that described with respect to step 408 of FIG. 4A and provides a match signal 508 (e.g., indicating the match and comprising the second placeholder value determined in step 604). In response to receiving match signal 508, placeholder service 120 of FIG. 5 retrieves modified resource 226 from data store 206 via signal 510. By obtaining modified resource 226 in this manner, placeholder service 120 reduces the compute resources and time required to rewrite resource 218 (e.g., based on policies of proxy service 112 and in a manner that satisfies request 502). For instance, rewriting engine 204 in accordance with an embodiment obtains modified resource 226 in response to resource modifier 118 receiving request 502 without parsing modified resource 226 to identify code components.

In step 608, a third modified version of the resource is generated by replacing the first placeholder with the second placeholder value. For example, placeholder service 120 of FIG. 5 generates a third modified version of resource 218 (modified resource 530) by replacing placeholders in modified resource 530 with the second placeholder value determined in step 604. As shown in FIG. 5, modified resource 530 comprises code 232, which comprises modified code component 534. In this context, modified code component 534 comprises the second placeholder value inserted by placeholder service 120. Placeholder service 120 generates modified resource 530 in a manner similar to that described with respect to the generation of modified resource 230 (e.g., as described with respect to FIGS. 2, 4A, and 4C), as well as other techniques for generating modified resource by replacing placeholders with placeholder values, as described elsewhere herein. In accordance with an embodiment, placeholder 120 selects the placeholder value to replace the placeholder with based on a placeholder value determined in step 604, proxy service 112, a user account of client computing device 514, web browser 516, and/or any other data associated with the proxy session between web browser 516 and proxy service 112.

In step 610, the third modified version of the resource is transmitted to the second client computing device. For example, placeholder service 120 of FIG. 5 transmits modified resource 530 to web browser 516 executing on client computing device 514.

IV. Example Client-Side Proxy Service Embodiments

As described herein, embodiments of the present disclosure enable a proxy service executing on a proxy computing device interconnected between a client computing device and a server computing device to rewrite code of resources using placeholders. In an alternative (or additional) aspect, a web browser executing on a client computing device includes a client-side proxy service that enables client-side rewriting of code included in web pages provided to the web browser. To further illustrate client-side proxy service embodiments, FIG. 7 will now be described. FIG. 7 is a block diagram of an example system 700 in which a proxy computing device is interconnected between a client computing device and a server computing device, where the proxy computing device executes a proxy service, the client computing device executes a web browser comprising a client-side proxy service, and the server computing device executes a web server, in accordance with an embodiment. As shown in FIG. 2, system 700 comprises server computing device 104 (comprising web server 106), proxy computing device 110 (comprising proxy service 112), and client computing device 114 (comprising web browser 116), as each described above with respect to FIG. 1. As further shown in FIG. 2, proxy service 112 comprises a web page modifier 704 and web browser 116 comprises a client-side proxy service 702. Client-side proxy service 702 comprises a placeholder initialization service 706, an event detector 708, rewriting logic 710, evaluation logic 712, and verification logic 728. In accordance with an embodiment, client-side proxy service 702 is provided to web browser 116 by proxy service 112 (e.g., by proxy service 112 including client-side proxy service 702 in a response (e.g., in a web page or resource included in the response)). Alternatively, client-side proxy service 702 is stored in a cache of web browser 116. As also shown in FIG. 2, proxy service receives a web page 718 and outputs a modified web page 720. Web page 718 comprises code 722 while modified web page 720 comprises code 722 with an embedding function 724 and a code rewriting function 726. In accordance with an embodiment, code 722 of modified web page 720 comprises a modified code component and/or one or more placeholder values.

For illustrative purposes, system 700 is described with respect to FIG. 8. FIG. 8 depicts a flowchart 800 of a process for modifying a resource by a client-side proxy service, in accordance with an embodiment. System 700 of FIG. 7 may operate according to flowchart 800 in embodiments. Not all steps of flowchart 800 need be performed in all embodiments. Further structural and operational embodiments will be apparent to persons skilled in the relevant art(s) based on the following descriptions of FIGS. 7 and 8.

Flowchart 800 begins with step 802. In step 802, a modified version of a web page is received in a browser. The modified version of the web page comprises an embedding function and a code rewriting function not included in the web page. For example, web browser 116 of FIG. 7 receives modified web page 720 from web page modifier 704. Modified web page 720 comprises embedding function 724 and code rewriting function 726. Embedding function 724 is configured to modify code components by inserting placeholders in the code components and code rewriting function 726 is configured to replace placeholders with placeholder values.

In accordance with an embodiment, web page modifier 704 of proxy service 112 modifies web page 718 by inserting embedding function 724 and code rewriting function 726 in code 722 to generate modified web page 720. In accordance with an embodiment, web page modifier 704 operates in a manner similar to that described with respect to resource modifier 118 of FIGS. 1 and 2 to modify web pages (e.g., by parsing the web page to identify code components therein, insert placeholders into identified code components, and replace placeholders with placeholder values). In accordance with another embodiment, web page modifier 704 analyzes web page 718 to identify code components of code 722 (e.g., code of interest) and replaces the identified code component with a "wrapped code component". The wrapped code component includes a call to embedding function 724, the call to embedding function 724 includes the identified code component as an argument thereof. In this case, if a user of client computing device 114 interacts with modified web page 720 on client computing device 114 in a way that would normally have triggered evaluation of the original code component, the wrapped code component will be evaluated.

In accordance with an embodiment, responsive to receiving modified web page 720, web browse 116 stores embedding function 724 and/or code rewriting function 726 in a browser cache (not pictured in FIG. 7). In this context, further responses of modified web pages from proxy service 112 do not need to include the function(s) stored by web browser 116. For instance, alternative to including embedding function 724 and/or code rewriting function 726 in modified web page 720, web page modifier 704 may include a reference to the function(s) that causes client computing device 114 to load the function(s) into modified web page 720 (e.g., when web browser 116 renders modified web page 720). The reference to embedding function 724 and/or code rewriting function 726 may be a prompt to load a file (e.g., a library, a JavaScript file, and/or the like) that includes the corresponding function(s) and/or any other reference suitable for including embedding function 724 and/or code rewriting function 726 in modified web page 720.

In accordance with another embodiment, web page modifier 704 inserts code that, when executed by a processor of client computing device 114, executes client-side proxy service 702 (and subservices thereof) in modified web page 720.

In step 804, an event is detected in the web page. The event is associated with the embedding function and a code component. For example, event detector 708 of FIG. 7 detects an event in modified web page 720 as presented by web browser 116. For instance, suppose modified web page 720 is loaded for user viewing and interaction by web browser 116. For example, event detector 708 in accordance with an embodiment detects an event corresponding to an action of interest (e.g., a navigation action, a file download action, a file upload action, an AJAX action, etc.) that is to be evaluated with respect to a policy of proxy service 112. In accordance with a further embodiment, event detector 708 detects the action of interest by the evaluation of a modified code component (e.g., a wrapped code component or other modified code component) that includes a call to embedding function 724. In this context, when the modified code component is evaluated, embedding function 724 is called and flowchart 800 proceeds to step 806. In accordance with an embodiment, the call to embedding function 724 passes a corresponding code component as an argument thereof. In embodiments, the modified code component may be evaluated when web browser 116 renders modified web page 730 or may be evaluated (e.g., only) after web browser 116 renders modified web page 730 and a particular event occurs with respect to modified web page 730 (e.g., a user of client computing device 114 interacts with modified web page 730 in a particular way (e.g., changing an element, clicking a button, mousing over an element, mousing away from an element, pushing a keyboard key), and/or any other type of event associated with modified web page 730, as described elsewhere herein and/or as would otherwise be understood by a person of relevant skill(s) having benefit of this disclosure).

In step 806, a first modified version of the code component is generated by the embedding function inserting a placeholder in the code component. For example, rewriting logic 710 of FIG. 7 evaluates embedding function 724 to generate a first modified version of the code component ("first modified component" herein) by inserting a placeholder in the code component. In embodiments, embedding function 724 inserts a placeholder in the code component in a manner similar to rewriting engine 204 of system 200, as described with respect to FIGS. 2 and 3. For instance, embedding function 724 may determine if a suffix placeholder, a credential placeholder, a script context placeholder, and/or any other type of placeholder should be inserted in the code component and, if so, inserts the corresponding placeholder(s) in the code component to generate the first modified component. In accordance with an embodiment, representations of placeholders are determined by placeholder initialization service 706. Placeholder initialization service 706 may determine representations of placeholders in a manner similar to that described with respect to placeholder initialization service 202 of FIG. 2. While FIG. 8 is described with respect to inserting a (e.g., single) placeholder, it is also contemplated herein that embedding function 724 may insert multiple placeholders in a code component.

In step 808, an authentication credential is verified. For example, verification logic 728 of FIG. 7 verifies an authentication credential. In this context, the authentication credential may be stored in a browser cache of web browser 116 or in memory accessible to client computing device 114 (not shown in FIG. 7). In accordance with an embodiment, the authentication credential is provided to client computing device 114 by identity provider 108 (e.g., in response to authentication of a user or service of client computing device 114). Verification logic 728 may verify the authentication credential in a manner similar to that described with respect to verifier 238 of FIG. 2 and step 404 of flowchart 400 of FIG. 4A. If the authentication credential is verified, flowchart 800 proceeds to step 810.

In step 810, a placeholder value is determined. The placeholder value indicates the authentication credential is verified. For example, rewriting logic 710 of FIG. 7 determines the placeholder value corresponding to the authentication credential verified in step 808. In accordance with an embodiment, and as described with respect to FIG. 10 further below, rewriting logic 710 determines the corresponding placeholder value that indicates the authentication credential is verified based on a set of placeholder values received from proxy service 112. In accordance with an embodiment, the placeholder value is included in modified web page 720 received in step 802. Alternatively, the placeholder value is received from a previous transmission from proxy service 112. In accordance with another alternative embodiment, client-side proxy service 702 determines the placeholder value by transmitting a value request (not shown in FIG. 7) to proxy service 112 for the placeholder value and receiving a value response (not shown in FIG. 7). In accordance with another embodiment, rewriting logic 710 is preconfigured with the placeholder value. In any case, subsequent to determining the placeholder value, flowchart 800 proceeds to step 812.

In step 812, a second modified version of the code component is generated by the code rewriting function replacing the placeholder in the first modified version of the code with the placeholder value. For example, rewriting logic 710 of FIG. 7 evaluates code rewriting function 726 to generate a second modified version of the code component ("second modified component" herein) by replacing the placeholder in the first modified component with the placeholder value determined in step 810. In embodiments, code rewriting function 726 replaces placeholders in the first modified component in a manner similar to placeholder service 120 of system 200, as described with respect to FIGS. 2 and 4A. For instance, code rewriting function 726 in accordance with an embodiment selects placeholder values (e.g., initialized by placeholder initialization service 706, received from proxy service 112, or otherwise made available to code rewriting function 726 as described elsewhere herein) based on proxy service 112, a user account of client computing device 114, web browser 116, and/or any other data associated with the proxy session between web browser 116 and proxy service and/or a policy of proxy service 112.

In step 814, the second modified version of the code component is evaluated. For example, evaluation logic 712 of FIG. 7 evaluates the second modified component generated in step 808. In accordance with an embodiment, code rewriting function 726 is a code rewriting and evaluation function that evaluates the second modified component (e.g., automatically, in response to generation thereof, or as otherwise would be understood by a person ordinarily skilled in the relevant art(s) having benefit of this disclosure).

Thus, an example process for modifying a resource by a client-side proxy service has been described with respect to FIG. 8. As noted herein, steps of flowchart 800 may be performed in an order different than that shown in FIG. 8. For instance, while steps 808 and 810 have been depicted as subsequent to step 806 and before step 812, it is also contemplated herein that, in accordance with an embodiment, the verification of an authentication credential (step 808) and determination of a placeholder value indicating the authentication credential is verified (step 810) occurs when a web page is rendered by web browser 116 (e.g., subsequent to step 802). It is also contemplated herein that verification of authentication credentials and determination of a corresponding placeholder value may occur prior to web browser 116 receiving modified web page 720. For instance, in accordance with another embodiment, client-side proxy service 702 (or a subservice thereof) verifies an authentication credential in response to an identity provider providing the authentication credential to web browser 116 and determines a placeholder value indicating the authentication credential (e.g., for future use by rewriting logic 710).

First modified code components may be modified by replacing placeholders with placeholder values to generate a second modified code component in various ways, in embodiments. For instance, a call to code rewriting function 726 of FIG. 7 may be placed to generate a second modified code component. For example, FIG. 9 depicts a flowchart 900 of a process for generating a second modified version of a code component, in accordance with an embodiment. System 700 of FIG. 7 may operate according to flowchart 900 in embodiments. In accordance with an embodiment, flowchart 900 is a further embodiment of step 812 of flowchart 800 as described with respect to FIG. 8. Flowchart 900 need not be performed in all embodiments. Further structural and operational embodiments will be apparent to persons skilled in the relevant art(s) based on the following descriptions of FIGS. 7 and 9.

Flowchart 900 includes step 902. In step 902, a call to the code rewriting function is executed by the embedding function. The call to the code rewriting function comprises the first modified version of the code component as an argument thereof. For example, embedding function 724 comprises a call to code rewriting function 726 such that when embedding function 724 is evaluated, the call to code rewriting function 726 is placed to generate the second modified version of the code component. The call to code rewriting function 726 comprises the first modified component generated in step 806 of flowchart 800 as an argument thereof.

As described with respect to FIGS. 7 and 8, code rewriting function 726 replaces placeholders with placeholder values. Client-side proxy service 702 may obtain placeholder values in various ways, in embodiments. For instance, placeholder initialization service 706 may determine a placeholder value based on web browser 116 (e.g., based on properties of web browser 116, based on data stored in a browser cache of web browser 116, etc.), client computing device 114 (e.g., based on properties of client computing device 114, based on an application installed on client computing device 114, based on data stored in memory of client computing device 114, etc.), a user of client computing device 114 (and/or a user account of the user), tokens received from an identity provider (e.g., subsequent to authenticating a user's login credentials) and/or the like. Alternatively, placeholder initialization service 706 obtains placeholder values from proxy service 112. Placeholder initialization service 706 may obtain placeholder values from proxy service 112 in various ways, in embodiments. For example, FIG. 10 depicts a flowchart of a process for storing a placeholder value, in accordance with an embodiment. System 700 of FIG. 7 may operate according to flowchart 1000 in embodiments. Not all steps of flowchart 1000 need be performed in all embodiments. Further structural and operational embodiments will be apparent to persons skilled in the relevant art(s) based on the following descriptions of FIGS. 7 and 10.

Flowchart 1000 starts with step 1002. In step 1002, the placeholder value is received from a proxy computing device. For example, web browser 116 of FIG. 7 receives a placeholder value from proxy service 112 of proxy computing device 110. In accordance with an embodiment, web browser 116 receives the placeholder value as part of establishing a proxy session with proxy service 112. Alternatively, web page modifier 704 includes (e.g., inserts) the placeholder value in modified web page 720 (e.g., in code 722). In another alternative embodiment, web page modifier 704 transmits the placeholder value as a separate response to a request received from web browser 116. In another alternative embodiment, client-side proxy service 702 is preconfigured with the placeholder value.

In step 1004, the placeholder value is stored in memory accessible by the client-side proxy service. For example, web browser 116 (or client-side proxy service 702) of FIG. 7 stores the placeholder value received in step 1002 in memory accessible to client-side proxy service 702 (e.g., in a cache of web browser 116, not shown in FIG. 7).

While flowchart 1000 is described with respect to a single (e.g., a first) placeholder value, it is also contemplated herein that web browser 116 (and/or client-side proxy service 702) may receive and store multiple placeholder values (e.g., a suffix placeholder, a credential placeholder, a context placeholder, etc.).

Web browser 116 may receive modified web pages in various ways, in embodiments. For instance, web browser 116 in accordance with an embodiment receives a modified web page in response to a request for the (e.g., original version) of the web page. For example, FIG. 11 depicts a flowchart 1100 of a process for requesting a web page, in accordance with an embodiment. System 700 of FIG. 7 may operate according to flowchart 1100 in embodiments. Not all steps of flowchart 1100 need be performed in all embodiments. Further structural and operational embodiments will be apparent to persons skilled in the relevant art(s) based on the following descriptions of FIGS. 7 and 11.

Flowchart 1100 begins with step 1102. In step 1102, a request for the web page is sent to a proxy computing device. For example, web browser 116 executing on client computing device 114 transmits a request 714 for a web page to proxy service 112. In accordance with an embodiment, request 714 further includes client-side generated content and/or metadata associated with client computing device 114 and/or web browser 116. In accordance with an embodiment, web browser 116 transmits request 714 to proxy service 112 in response to identity provider (e.g., identity provider 108 of FIG. 1) having determined based on an access policy that request 714 should be redirected to proxy service 112. In this context, request 714 may comprise an (e.g., encrypted) authentication token provided to web browser 116 by identity provider 108.

Flowchart 1100 continues to step 1104. In accordance with an embodiment, step 1104 is a further embodiment of step 802 of flowchart 800, as described with respect to FIG. 8. In step 1104, the modified version of the web page is received from the proxy computing device responsive to sending the request. For example, web browser 116 executing on client computing device 114 receives modified web page 720 from proxy service 112.

By virtue of the operation of web page modifier 704 (as described with respect to FIGS. 7 and 8, as well as elsewhere herein), modified web page 720 includes embedding function 724 and code rewriting function 726 (and/or client-side proxy service 702, one or more wrapped code components, and one or more placeholder values), but these entities are not included in the web page requested in step 702 (e.g., web page 718). Instead, in response to receiving request 714, proxy service 112 issues a corresponding request 716 to web server 106, requesting that web server 106 fulfills request 714. Proxy service 112 receives a response corresponding to request 716 and comprising web page 718 from web server 106. As shown in FIG. 7, web page 718 comprises code 722 (e.g., JavaScript code). In embodiments, code 722 comprises one or more code components, as described elsewhere herein. Web page modifier 704 modifies code 722 of web page 718 to include embedding function 724 and code rewriting function 726 (and optionally client-side proxy service 702, wrapped code components (that replace corresponding code components of code 722), and/or one or more placeholder values).

V. Example Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 12. FIG. 12 shows a block diagram of an exemplary computing environment 1200 that includes a computing device 1202. Computing device 1202 is an example of client computing device 114, server computing device 104, and/or proxy computing device 110 of FIG. 1, and/or client computing device 514 of FIG. 5, each of which may include one or more of the components of computing device 1202. In some embodiments, computing device 1202 is communicatively coupled with devices (not shown in FIG. 12) external to computing environment 1200 via network 1204. Network 1204 comprises one or more networks such as local area networks (LANs), wide area networks (WANs), enterprise networks, the Internet, etc., and may include one or more wired and/or wireless portions. Network 1204 may additionally or alternatively include a cellular network for cellular communications. Computing device 1202 is described in detail as follows Computing device 1202 can be any of a variety of types of computing devices. For example, computing device 1202 may be a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, a phone implementing an operating system, etc.), a wearable computing device (e.g., a head-mounted augmented reality and/or virtual reality device including smart glasses, etc.), or other type of mobile computing device. Computing device 1202 may alternatively be a stationary computing device such as a desktop computer, a personal computer (PC), a stationary server device, a minicomputer, a mainframe, a supercomputer, etc.

As shown in FIG. 12, computing device 1202 includes a variety of hardware and software components, including a processor 1210, a storage 1220, one or more input devices 1230, one or more output devices 1250, one or more wireless modems 1260, one or more wired interfaces 1280, a power supply 1282, a location information (LI) receiver 1284, and an accelerometer 1286. Storage 1220 includes memory 1256, which includes non-removable memory 1222 and removable memory 1224, and a storage device 1290. Storage 1220 also stores an operating system 1212, application programs 1214, and application data 1216. Wireless modem(s) 1260 include a Wi-Fi modem 1262, a Bluetooth modem 1264, and a cellular modem 1266. Output device(s) 1250 includes a speaker 1252 and a display 1254. Input device(s) 1230 includes a touch screen 1232, a microphone 1234, a camera 1236, a physical keyboard 1238, and a trackball 1240. Not all components of computing device 1202 shown in FIG. 12 are present in all embodiments, additional components not shown may be present, and any combination of the components may be present in a particular embodiment. These components of computing device 1202 are described as follows.

A single processor 1210 (e.g., central processing unit (CPU), microcontroller, a microprocessor, signal processor, ASIC (application specific integrated circuit), and/or other physical hardware processor circuit) or multiple processors 1210 may be present in computing device 1002 for performing such tasks as program execution, signal coding, data processing, input/output processing, power control, and/or other functions. Processor 1210 may be a single-core or multi-core processor, and each processor core may be single-threaded or multithreaded (to provide multiple threads of execution concurrently). Processor 1210 is configured to execute program code stored in a computer readable medium, such as program code of operating system 1212 and application programs 1214 stored in storage 1220. Operating system 1212 controls the allocation and usage of the components of computing device 1202 and provides support for one or more application programs 1214 (also referred to as "applications" or "apps"). Application programs 1214 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1202 can communicate with any other component according to function, although not all connections are shown for ease of illustration. For instance, as shown in FIG. 12, bus 1206 is a multiple signal line communication medium (e.g., conductive traces in silicon, metal traces along a motherboard, wires, etc.) that may be present to communicatively couple processor 1210 to various other components of computing device 1202, although in other embodiments, an alternative bus, further buses, and/or one or more individual signal lines may be present to communicatively couple components. Bus 1206 represents one or more of any of several types of bus structures, including a memory bus or memory controller, a peripheral bus, an accelerated graphics port, and a processor or local bus using any of a variety of bus architectures.

Storage 1220 is physical storage that includes one or both of memory 1256 and storage device 1290, which store operating system 1212, application programs 1214, and application data 1216 according to any distribution. Non-removable memory 1222 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1222 may include main memory and may be separate from or fabricated in a same integrated circuit as processor 1210. As shown in FIG. 12, non-removable memory 1222 stores firmware 1218, which may be present to provide low-level control of hardware. Examples of firmware 1218 include BIOS (Basic Input/Output System, such as on personal computers) and boot firmware (e.g., on smart phones). Removable memory 1224 may be inserted into a receptacle of or otherwise coupled to computing device 1202 and can be removed by a user from computing device 1202. Removable memory 1224 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1290 may be present that are internal and/or external to a housing of computing device 1202 and may or may not be removable. Examples of storage device 1290 include a hard disk drive, a SSD, a thumb drive (e.g., a USB (Universal Serial Bus) flash drive), or other physical storage device.

One or more programs may be stored in storage 1220. Such programs include operating system 1212, one or more application programs 1214, and other program modules and program data. Examples of such application programs may include, for example, computer program logic (e.g., computer program code/instructions) for implementing one or more of web server 106, identity provider 108, proxy service 112, web browser 116, resource modifier 118, placeholder service 120, placeholder initialization service 202, rewriting engine 204, web browser 516, client-side proxy service 702, web page modifier 704, placeholder initialization service 706, event detector 708, rewriting logic 710, and/or evaluation logic 712, along with any components and/or subcomponents thereof, as well as the flowcharts/flow diagrams (e.g., flowcharts 300, 400, 420, 430, 600, 800, 900, 1000, and/or 1100) described herein, including portions thereof, and/or further examples described herein.

Storage 1220 also stores data used and/or generated by operating system 1212 and application programs 1214 as application data 1216. Examples of application data 1216 include web pages, text, images, tables, sound files, video data, and other data, which may also be sent to and/or received from one or more network servers or other devices via one or more wired or wireless networks. Storage 1220 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1202 through one or more input devices 1230 and may receive information from computing device 1002 through one or more output devices 1250. Input device(s) 1230 may include one or more of touch screen 1232, microphone 1234, camera 1236, physical keyboard 1238 and/or trackball 1240 and output device(s) 1250 may include one or more of speaker 1252 and display 1254. Each of input device(s) 1230 and output device(s) 1250 may be integral to computing device 1202 (e.g., built into a housing of computing device 1202) or external to computing device 1202 (e.g., communicatively coupled wired or wirelessly to computing device 1202 via wired interface(s) 1280 and/or wireless modem(s) 1260). Further input devices 1230 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1254 may display information, as well as operating as touch screen 1232 by receiving user commands and/or other information (e.g., by touch, finger gestures, virtual keyboard, etc.) as a user interface. Any number of each type of input device(s) 1230 and output device(s) 1250 may be present, including multiple microphones 1234, multiple cameras 1236, multiple speakers 1252, and/or multiple displays 1254.

One or more wireless modems 1260 can be coupled to antenna(s) (not shown) of computing device 1202 and can support two-way communications between processor 1210 and devices external to computing device 1202 through network 1204, as would be understood to persons skilled in the relevant art(s). Wireless modem 1260 is shown generically and can include a cellular modem 1266 for communicating with one or more cellular networks, such as a GSM network for data and voice communications within a single cellular network, between cellular networks, or between the mobile device and a public switched telephone network (PSTN). Wireless modem 1260 may also or alternatively include other radio-based modem types, such as a Bluetooth modem 1264 (also referred to as a "Bluetooth device") and/or Wi-Fi 1062 modem (also referred to as an "wireless adaptor"). Wi-Fi modem 1262 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 1202 can further include power supply 1282, LI receiver 1284, accelerometer 1286, and/or one or more wired interfaces 1280. Example wired interfaces 1280 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1280 of computing device 1202 provide for wired connections between computing device 1202 and network 1204, or between computing device 1202 and one or more devices/peripherals when such devices/peripherals are external to computing device 1202 (e.g., a pointing device, display 1254, speaker 1252, camera 1236, physical keyboard 1238, etc.). Power supply 1282 is configured to supply power to each of the components of computing device 1202 and may receive power from a battery internal to computing device 1202, and/or from a power cord plugged into a power port of computing device 1202 (e.g., a USB port, an A/C power port). LI receiver 1284 may be used for location determination of computing device 1202 and may include a satellite navigation receiver such as a Global Positioning System (GPS) receiver or may include other type of location determiner configured to determine location of computing device 1202 based on received information (e.g., using cell tower triangulation, etc.). Accelerometer 1086 may be present to determine an orientation of computing device 1202.

Note that the illustrated components of computing device 1202 are not required or all-inclusive, and fewer or greater numbers of components may be present as would be recognized by one skilled in the art. For example, computing device 1202 may also include one or more of a gyroscope, barometer, proximity sensor, ambient light sensor, digital compass, etc. Processor 1210 and memory 1256 may be co-located in a same semiconductor device package, such as being included together in an integrated circuit chip, FPGA, or system-on-chip (SOC), optionally along with further components of computing device 1202.

In embodiments, computing device 1202 is configured to implement any of the above-described features of flowcharts herein. Computer program logic for performing any of the operations, steps, and/or functions described herein may be stored in storage 1220 and executed by processor 1210.

In some embodiments, server infrastructure 1270 may be present in computing environment 1200 and may be communicatively coupled with computing device 1202 via network 1204. Server infrastructure 1270, when present, may be a network-accessible server set (e.g., a cloud computing platform). As shown in FIG. 12, server infrastructure 1270 includes clusters 1272. Each of clusters 1272 may comprise a group of one or more compute nodes and/or a group of one or more storage nodes. For example, as shown in FIG. 12, cluster 1272 includes nodes 1274. Each of nodes 1274 are accessible via network 1204 (e.g., in a "cloud computing platform" or "cloud-based" embodiment) to build, deploy, and manage applications and services. Any of nodes 1274 may be a storage node that comprises a plurality of physical storage disks, SSDs, and/or other physical storage devices that are accessible via network 1204 and are configured to store data associated with the applications and services managed by nodes 1074. For example, as shown in FIG. 12, nodes 1274 may store application data 1278.

Each of nodes 1274 may, as a compute node, comprise one or more server computers, server systems, and/or computing devices. For instance, a node 1274 may include one or more of the components of computing device 1202 disclosed herein. Each of nodes 1274 may be configured to execute one or more software applications (or "applications") and/or services and/or manage hardware resources (e.g., processors, memory, etc.), which may be utilized by users (e.g., customers) of the network-accessible server set. For example, as shown in FIG. 12, nodes 1274 may operate application programs 1276. In an implementation, a node of nodes 1274 may operate or comprise one or more virtual machines, with each virtual machine emulating a system architecture (e.g., an operating system), in an isolated manner, upon which applications such as application programs 1276 may be executed.

In an embodiment, one or more of clusters 1272 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1272 may be a datacenter in a distributed collection of datacenters. In embodiments, exemplary computing environment 1200 comprises part of a cloud-based platform, although this is only an example and is not intended to be limiting.

In an embodiment, computing device 1202 may access application programs 1276 for execution in any manner, such as by a client application and/or a browser at computing device 1202.

For purposes of network (e.g., cloud) backup and data security, computing device 1202 may additionally and/or alternatively synchronize copies of application programs 1214 and/or application data 1216 to be stored at network-based server infrastructure 1270 as application programs 1276 and/or application data 1278. For instance, operating system 1212 and/or application programs 1214 may include a file hosting service client configured to synchronize applications and/or data stored in storage 1220 at network-based server infrastructure 1270.

In some embodiments, on-premises servers 1292 may be present in computing environment 1200 and may be communicatively coupled with computing device 1202 via network 1204. On-premises servers 1292, when present, are hosted within an organization's infrastructure and, in many cases, physically onsite of a facility of that organization. On-premises servers 1292 are controlled, administered, and maintained by IT (Information Technology) personnel of the organization or an IT partner to the organization. Application data 1298 may be shared by on-premises servers 1292 between computing devices of the organization, including computing device 1202 (when part of an organization) through a local network of the organization, and/or through further networks accessible to the organization (including the Internet). Furthermore, on-premises servers 1292 may serve applications such as application programs 1296 to the computing devices of the organization, including computing device 1202. Accordingly, on-premises servers 1292 may include storage 1294 (which includes one or more physical storage devices such as storage disks and/or SSDs) for storage of application programs 1096 and application data 1298 and may include one or more processors for execution of application programs 1296. Still further, computing device 1202 may be configured to synchronize copies of application programs 1214 and/or application data 1216 for backup storage at on-premises servers 1292 as application programs 1296 and/or application data 1298.

Embodiments described herein may be implemented in one or more of computing device 1202, network-based server infrastructure 1270, and on-premises servers 1292. For example, in some embodiments, computing device 1202 may be used to implement systems, clients, or devices, or components/subcomponents thereof, disclosed elsewhere herein. In other embodiments, a combination of computing device 1202, network-based server infrastructure 1270, and/or on-premises servers 1292 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1220. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1214) may be stored in storage 1220. Such computer programs may also be received via wired interface(s) 1280 and/or wireless modem(s) 1260 over network 1204. Such computer programs, when executed or loaded by an application, enable computing device 1202 to implement features of embodiments discussed herein. Accordingly, such computer programs represent controllers of the computing device 1202.

Embodiments are also directed to computer program products comprising computer code or instructions stored on any computer-readable medium or computer-readable storage medium. Such computer program products include the physical storage of storage 1220 as well as further physical storage types.

VI. Additional Exemplary Embodiments

A system is described herein. The system comprises a proxy computing device. The proxy computing device:

receives a first request for a resource from a first client computing device, the first request comprising an authentication credential; verifies the authentication credential; determines a first placeholder value indicating the authentication credential is verified; determines the requested resource corresponds to a first modified version of the resource stored in memory accessible to the proxy computing device, the first modified version comprising a code component that includes a first placeholder inserted by the proxy computing device; retrieves the first modified version; generates a second modified version of the resource by replacing the first placeholder with the first placeholder value; and transmits the second modified version of the resource to the first client computing device.

In one implementation of the foregoing system, the proxy computing device: receives the resource from a server computing device; identifies the code component included in the resource; generates the first modified version of the resource by inserting the first placeholder in the identified code component; and stores the first modified version of the resource in the memory.

In one implementation of the foregoing system, code component includes a second placeholder inserted by the proxy computing device. The proxy computing device: determines a second placeholder value based on the received first request; and generates the second modified version by replacing the second placeholder with a second placeholder value.

In one implementation of the foregoing system, the second placeholder comprises: a suffix placeholder specifying a suffix to be inserted into the identified code component; or a context placeholder specifying a script context to be inserted in the identified code component.

In one implementation of the foregoing system, the proxy computing device stores the first placeholder value in the memory.

In one implementation of the foregoing system, the proxy computing device: receives a second request for the resource from a second client computing device; determines a second placeholder value based on the received second request; retrieves the first modified version; generates a third modified version of the resource by replacing the placeholder with the second placeholder value; and transmits the third modified version of the resource to the second client computing device.

In one implementation of the foregoing system, the proxy computing device executes a security proxy.

In one implementation of the foregoing system, the identified code component comprises a static import statement.

A method performed by a proxy computing device is described herein. The method comprises: receiving a first request for a resource from the first client computing device, the first request comprising an authentication credential; verifying the authentication credential; determining a first placeholder value indicating the authentication credential is verified; determining the requested resource corresponds to a first modified version of the resource stored in memory accessible to the proxy computing device, the first modified version comprising a code component that includes a first placeholder inserted by the proxy computing device; retrieving the first modified version; generating a second modified version of the resource by replacing the first placeholder with the first placeholder value; and transmitting the second modified version of the resource to the first client computing device.

In one implementation of the foregoing method, receiving the resource from a server computing device; identifying the code component included in the resource; generating the first modified version of the resource by inserting the first placeholder in the identified code component; storing the first modified version of the resource in the memory;

In one implementation of the foregoing method, the code component includes a second placeholder inserted by the proxy computing device. The method further comprises: determining a second placeholder value based on the received first request; and generating the second modified version by replacing the second placeholder with a second placeholder value.

In one implementation of the foregoing method, the placeholder comprises: a suffix placeholder specifying a suffix to be inserted into the identified code component; or a context placeholder specifying a script context to be inserted in the identified code component.

In one implementation of the foregoing method, the method further comprises storing the first placeholder value in the memory.

In one implementation of the foregoing method, the method further comprises: receiving a second request for the resource from a second client computing device; determining a second placeholder value based on the received second request; retrieving the first modified version; generating a third modified version of the resource by replacing the placeholder with the second placeholder value; and transmitting the third modified version of the resource to the second client computing device.

In one implementation of the foregoing method, the proxy computing device executes a security proxy to perform the method.

In one implementation of the foregoing method, the identified code component comprises a static import statement.

A computer-readable storage medium having programming instructions encoded thereon is described herein. The programming instructions are executable by a processor circuit of a proxy computing device to perform a method. The method comprises: receiving a first request for a resource from the first client computing device, the first request comprising an authentication credential; verifying the authentication credential; determining a first placeholder value indicating the authentication credential is verified; determining the requested resource corresponds to a first modified version of the resource stored in memory accessible to the proxy computing device, the first modified version comprising a code component that includes a first placeholder inserted by the proxy computing device; retrieving the first modified version; generating a second modified version of the resource by replacing the placeholder with the first placeholder value; and transmitting the second modified version of the resource to a first client computing device.

In one implementation of the foregoing computer-readable storage medium, the method further comprises: receiving a resource from a server computing device; identifying a code component included in the resource; generating a first modified version of the resource by inserting a placeholder in the identified code component; storing the first modified version of the resource in the memory.

In one implementation of the foregoing computer-readable storage medium, the code component includes a second placeholder value inserted by the proxy computing device. The method further comprises: determining the second placeholder value based on the received first request, and generating the second modified version by replacing the second placeholder with a second placeholder value.

In one implementation of the foregoing computer-readable storage medium, the second placeholder comprises: a suffix placeholder specifying a suffix to be inserted into the identified code component; or a context placeholder specifying a script context to be inserted in the identified code component.

In one implementation of the foregoing computer-readable storage medium, the method further comprises storing the first placeholder value in the memory.

In one implementation of the foregoing computer-readable storage medium, the method further comprises: receiving a second request for the resource from a second client computing device; determining a second placeholder value based on the received second request; obtaining the first modified version; generating a third modified version of the resource by replacing the first placeholder with the second placeholder value; and transmitting the third modified version of the resource to the second client computing device.

In one implementation of the foregoing computer-readable storage medium, the proxy computing device executes a security proxy to perform the method.

In one implementation of the foregoing computer-readable storage medium, the identified code component comprises a static import statement.

A method performed by a browser of a client computing device is described herein. The method comprises: receiving, in the browser, a modified version of a web page, the modified version of the web page comprising an embedding function and a code rewriting function not included in the web page; detecting an event in the web page associated with the embedding function and a code component; generating, by the embedding function, a first modified version of the code component by inserting a placeholder in the code component; verifying an authentication credential; determining a placeholder value indicating the authentication credential is verified; generating, by the code rewriting function, a second modified version of the code component by replacing the placeholder in the first modified version of the code component with a first placeholder value; and evaluating the second modified version of the code component.

In one implementation of the foregoing method, the detected event comprises an execution of a call to the embedding function, the call to the embedding function including the code component as an argument thereof.

In one implementation of the foregoing method, said generating the second modified version of the code component comprises: executing, by the embedding function, a call to the code rewriting function, the call to the code rewriting function comprising the second modified version of the code component as an argument thereof.

In one implementation of the foregoing method, the method further comprises: receiving, in the browser, the first placeholder value from a proxy computing device.

In one implementation of the foregoing method, the method further comprises: sending a request for the web page to a proxy computing device; and responsive to sending the request, receiving the modified version of the web page from the proxy computing device.

In one implementation of the foregoing method, the code component comprises a second placeholder comprising: a suffix placeholder specifying a suffix to be inserted into the code component; or a context placeholder specifying a script context to be inserted in the code component.

In one implementation of the foregoing method, the identified code component comprises a static import statement.

A client computing device is described herein. The client computing device comprises a processor circuit and a memory. The memory stores program code executable by the processor circuit to execute a web browser and perform operations. The operations comprise: receiving, in the browser from a proxy computing device, a modified version of a web page, the modified version of the web page comprising an embedding function and a code rewriting function not included in the web page; detecting an event in the web page associated with the embedding function and a code component; generating, by the embedding function, a first modified version of the code component by inserting a placeholder in the code component; verifying an authentication credential; determining a placeholder value indicating the authentication credential is verified; generating, by the code rewriting function, a second modified version of the code component by replacing the placeholder in the first modified version of the code component with a first placeholder value; and evaluating the second modified version of the code component.

In one implementation of the foregoing client computing device, the detected event comprises an execution of a call to the embedding function, the call to the embedding function including the code component as an argument thereof.

In one implementation of the foregoing client computing device, said generating the second modified version of the code component comprises: executing, by the embedding function, a call to the code rewriting function, the call to the code rewriting function comprising the second modified version of the code component as an argument thereof.

In one implementation of the foregoing client computing device, the operations further comprise: receiving, in the browser, the first placeholder value from a proxy computing device.

In one implementation of the foregoing client computing device, the operations further comprises: sending a request for the web page to a proxy computing device; and responsive to sending the request, receiving the modified version of the web page from the proxy computing device.

In one implementation of the foregoing client computing device, the code component comprises a second placeholder comprising: a suffix placeholder specifying a suffix to be inserted into the code component; or a context placeholder specifying a script context to be inserted in the code component.

In one implementation of the foregoing client computing device, the identified code component comprises a static import statement.

A system comprising the foregoing client computing device is described herein.

A computer-readable storage medium having programming instructions encoded thereon is described herein. The programming instructions are executable by a processor circuit of a client computing device to perform a method. The method comprises: receiving, in a browser of the client computing device, a modified version of a web page, the modified version of the web page comprising an embedding function and a code rewriting function not included in the web page; detecting an event in the web page associated with the embedding function and a code component; generating, by the embedding function, a first modified version of the code component by inserting a placeholder in the code component; verifying an authentication credential; determining a placeholder value indicating the authentication credential is verified; generating, by the code rewriting function, a second modified version of the code component by replacing the placeholder in the first modified version of the code component with a first placeholder value; and evaluating the second modified version of the code component.

In one implementation of the foregoing computer-readable storage medium, the detected event comprises an execution of a call to the embedding function, the call to the embedding function including the code component as an argument thereof.

In one implementation of the foregoing computer-readable storage medium, said generating the second modified version of the code component comprises: executing, by the embedding function, a call to the code rewriting function, the call to the code rewriting function comprising the second modified version of the code component as an argument thereof.

In one implementation of the foregoing computer-readable storage medium, the method further comprises: receiving, in the browser, the first placeholder value from a proxy computing device.

In one implementation of the foregoing computer-readable storage medium, the method further comprises: sending a request for the web page to a proxy computing device; and responsive to sending the request, receiving the modified version of the web page from the proxy computing device.

In one implementation of the foregoing computer-readable storage medium, the code component comprises a second placeholder comprising: a suffix placeholder specifying a suffix to be inserted into the code component; or a context placeholder specifying a script context to be inserted in the code component.

In one implementation of the foregoing computer-readable storage medium, the identified code component comprises a static import statement.

VII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, identity providers, web browsers, proxy services, resource modifiers, web page modifiers, placeholder services, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A computing device comprising:
a processor; and
memory storing programming instructions structured to cause the processor to:
send a request for a first resource to a proxy computing device;
receive a modified version of the first resource from the proxy computing device, the modified version of the first resource comprising an embedding function and a code rewriting function not included in the first resource;
detect an event associated with the embedding function and a code component;

insert, by the embedding function, a placeholder in the code component, resulting in a first modified version of the code component;
verify an authentication credential;
determine a placeholder value indicating the authentication credential is verified; and
replace, by the code rewriting function, the placeholder in the first modified version of the code component with the placeholder value, resulting in a second modified version of the code component.

2. The computing device of claim 1, wherein the first resource comprises a web page, the modified version of the first resource comprises a modified version of the web page, and the programming instructions are further structured to cause the processor to:
present the modified version of the web page in a browser executed by the computing device.

3. The computing device of claim 1, wherein the programming instructions are further structured to cause the processor to utilize a client-side proxy service to execute the embedding function and the code rewriting function.

4. The computing device of claim 3, wherein the client-side proxy service is configured with the placeholder device, and to determine the placeholder value, the programming instructions are structured to cause the processor to:
determine the placeholder value based on the configuration of the client-side proxy service.

5. The computing device of claim 3, wherein the programming instructions are further structured to cause the processor to:
receive the client-side proxy service from the proxy computing device.

6. The computing device of claim 1, wherein to determine the placeholder value, the programming instructions are further structured to cause the processor to:
obtain the placeholder value from the proxy computing device.

7. The computing device of claim 6, wherein to obtain the placeholder value, the programming instructions are further structured to cause the processor to:
establish a proxy session with the proxy computing device; and
receive the placeholder value from the proxy computing device.

8. The computing device of claim 1, wherein to replace the placeholder in the first modified version of the code component with the placeholder value, the programming instructions are further structured to cause the processor to:
execute, by the embedding function, a call to the code rewriting function, the call comprising the first modified component as an argument thereof.

9. The computing device of claim 1, wherein the programming instructions are further structured to cause the processor to:
store the embedding function and the code rewriting function in memory accessible to the computing device;
receive a modified version of a second resource from the proxy computing device, the modified version of the second resource comprising a prompt to access the embedding function.

10. A method performed by a client-side proxy service executing on a computing device comprising:
establishing a proxy session with a proxy-side proxy service executing on a proxy computing device;
receiving a placeholder value from the proxy-side proxy service, the placeholder value indicating an authentication credential is verified;
storing the placeholder value in memory accessible to the client-side proxy service;
detecting an event associated with an embedding function of the client-side proxy service and a code component of a resource;
generating, by the embedding function, a first modified version of the code component comprising a placeholder;
replacing, by a code rewriting function of the client-side proxy service, the placeholder with the stored placeholder value, resulting in a second modified version of the code component.

11. The method of claim 10, wherein:
the resource comprises a web page;
the method further comprises presenting the web page in a browser executed by the computing device; and
said detecting the event comprises detecting the event in the web page.

12. The method of claim 10, wherein the embedding function is stored in memory accessible to the client-side proxy service and the method further comprises:
receiving the resource from the proxy-side proxy service, the resource comprising the code component and a reference to the embedding function.

13. The method of claim 12, further comprising:
accessing, based on the reference, the embedding function stored in the memory accessible to the client-side proxy service.

14. The method of claim 10, wherein said replacing the placeholder with the stored placeholder value comprises:
executing, by the embedding function, a call to the code rewriting function, the call comprising the first modified component as an argument thereof.

15. A computer-readable storage medium having programming instructions encoded thereon that are executable by a processor circuit of a computing device to perform a method, the method comprising:
sending a request for a resource to a proxy computing device;
receiving, from the proxy computing device, a modified version of the resource, the modified version of the resource comprising an embedding function and a code rewriting function not included in the resource;
detecting an event in the resource associated with the embedding function and a code component;
inserting, by the embedding function, a placeholder in the code component, resulting in a first modified version of the code component;
verifying an authentication credential;
determining a placeholder value indicating the authentication credential is verified;
replacing, by the code rewriting function, the placeholder in the first modified version of the code component with the placeholder value, resulting in a second modified version of the code component.

16. The computer-readable storage medium of claim 15, wherein the first resource comprises a web page, the modified version of the first resource comprises a modified version of the web page, and the method further comprises:
presenting the modified version of the web page in a browser executed by the computing device.

17. The computer-readable storage medium of claim 15, wherein said determining the placeholder value comprises:
  obtaining the placeholder value from the proxy computing device.

18. The computer-readable storage medium of claim 17, wherein said obtaining the placeholder value comprises:
  establishing a proxy session with the proxy computing device; and
  receiving the placeholder value from the proxy computing device.

19. The computer-readable storage medium of claim 15, wherein said replacing the placeholder in the first modified version of the code component with the placeholder value comprises:
  executing, by the embedding function, a call to the code rewriting function, the call comprising the first modified component as an argument thereof.

20. The computer-readable storage medium of claim 15, wherein the method further comprises:
  storing embedding function in memory accessible to the processor circuit;
  receiving another resource from the proxy computing device, the another resource comprising a reference to the embedding function; and
  accessing, based on the reference, the embedding function stored in the memory accessible to the processor circuit.

* * * * *